United States Patent
Ye et al.

(10) Patent No.: US 12,069,733 B2
(45) Date of Patent: Aug. 20, 2024

(54) QUALITY REPORT IN MESSAGE 3 (MSG3) FOR RELEASE 16 (REL-16) ENHANCED MACHINE TYPE COMMUNICATION (EMTC) AND NARROWBAND INTERNET OF THINGS (NB-IOT)

(71) Applicant: Apple Inc., Cupertino, CA (US)

(72) Inventors: Qiaoyang Ye, Fremont, CA (US);
Bharat Shrestha, Hillsboro, OR (US);
Debdeep Chatterjee, San Jose, CA (US); Gregory Morozov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 321 days.

(21) Appl. No.: 17/427,492

(22) PCT Filed: Feb. 12, 2020

(86) PCT No.: PCT/US2020/017968
§ 371 (c)(1),
(2) Date: Jul. 30, 2021

(87) PCT Pub. No.: WO2020/167979
PCT Pub. Date: Aug. 20, 2020

(65) Prior Publication Data
US 2022/0015150 A1     Jan. 13, 2022

Related U.S. Application Data

(60) Provisional application No. 62/804,969, filed on Feb. 13, 2019.

(51) Int. Cl.
*H04W 72/542*     (2023.01)
*H04W 74/0833*     (2024.01)

(52) U.S. Cl.
CPC ..... *H04W 74/0833* (2013.01); *H04W 72/542* (2023.01)

(58) Field of Classification Search
CPC ............. H04W 56/0045; H04W 56/00; H04W 16/28; H04W 84/04; H04W 88/08;
(Continued)

(56) References Cited

U.S. PATENT DOCUMENTS

2017/0331577 A1* 11/2017 Parkvall ................ H04L 5/1469
2017/0331670 A1* 11/2017 Parkvall ............... H04B 7/0617
(Continued)

FOREIGN PATENT DOCUMENTS

EP             3026830 A1      6/2016
WO    WO 2018/174595 A1      9/2018

OTHER PUBLICATIONS

International Search Report on Written Opinion directed to related International Application No. PCT/US2020/017968, mailed May 25, 2020, 13 pages.
(Continued)

*Primary Examiner* — Nathan S Taylor
(74) *Attorney, Agent, or Firm* — Sterne, Kessler, Goldstein & Fox P.L.L.C.

(57) ABSTRACT

Some embodiments of this disclosure include systems, apparatuses, methods, and computer-readable media for use in a wireless network for designing quality report for enhanced Machine Type Communication (EMTC) and Narrowband Internet of Things (NB-IOT). For example, some embodiments are directed to a user equipment (UE) including radio front end circuitry and processor circuitry coupled to the radio front end circuitry. The processor circuitry can be configured to determine a downlink (DL) quality metric based on a DL quality metric type and identify a message 3 (Msg3) signal based on the determined DL quality metric.

(Continued)

The processor circuitry can further be configured to transmit, using the radio front end circuitry, the identified Msg3 signal to a base station.

20 Claims, 16 Drawing Sheets

(58) Field of Classification Search
CPC ............... H04W 56/001; H04W 84/06; H04W 72/20; H04W 72/04; H04W 28/04; H04W 92/18; H04B 7/18589; H04B 7/185; H04L 1/1812; H04L 1/1861; H04L 1/1864; H04L 1/1893; H04L 1/1896; H04L 5/0055; H04L 5/0078; H04L 1/1607; H04L 1/18; H04L 1/16; H04L 5/00

See application file for complete search history.

(56) References Cited

U.S. PATENT DOCUMENTS

| | | | | |
|---|---|---|---|---|
| 2018/0070385 A1* | 3/2018 | Yang | ...................... | H04L 5/0053 |
| 2018/0092130 A1* | 3/2018 | Yang | .................. | H04W 72/0446 |
| 2018/0294916 A1* | 10/2018 | Akkarakaran | ......... | H04W 76/27 |
| 2019/0174554 A1* | 6/2019 | Deenoo | ............. | H04W 72/0453 |
| 2019/0230647 A1* | 7/2019 | Yang | ...................... | H04L 5/0051 |
| 2020/0029383 A1* | 1/2020 | Venugopal | ............ | H04W 76/19 |
| 2020/0037369 A1* | 1/2020 | Yang | ........................ | H04W 4/70 |
| 2020/0137624 A1* | 4/2020 | Dhanda | ................ | H04W 74/004 |
| 2020/0404700 A1* | 12/2020 | Li | ........................ | H04W 72/046 |
| 2021/0152318 A1* | 5/2021 | Park | ...................... | H04L 5/0057 |
| 2021/0274556 A1* | 9/2021 | Park | ...................... | H04W 24/10 |
| 2021/0360459 A1* | 11/2021 | Zhang | ................... | H04W 24/10 |

OTHER PUBLICATIONS

Samsung, "Feature summary of 6.2.1.5 Support of quality report in Msg3", 3GPP Draft; R1-1811691, 3GPP TSG RAN WG1 Meeting #94bis, Chengdu, China; Oct. 8, 2018-Oct. 12, 2018, Oct. 10, 2018 (Oct. 10, 2018), 12 pages.

Huawei et al., "Feature lead summary of support of quality report in Msg3 for non-anchor access", 3GPP Draft; R1-1813719, 3GPP TSG RAN WG1 Meeting #95, Spokane, USA; Nov. 12, 2018-Nov. 16, 2018, Nov. 14, 2018 (Nov. 14, 2018), 9 pages.

Huawei et al., "Introduction of DL channel quality reporting in MSG3", 3GPP Draft; R2-1807869 3GPP TSG-RAN WG2 Meeting #102, Busan, Korea; May 21, 2018-May 25, 2018, May 20, 2018 (May 20, 2018), 10 pages.

Chinese Office Action directed to Chinese Patent Application No. 202080013639.7, mailed Jan. 21, 2024; 14 pages.

* cited by examiner

QUALITY REPORT IN MESSAGE 3 (MSG3) FOR RELEASE 16 (REL-16) ENHANCED MACHINE TYPE COMMUNICATION (EMTC) AND NARROWBAND INTERNET OF THINGS (NB-IOT)

CROSS REFERENCE TO RELATED APPLICATIONS

This application is a U.S. National Phase of International Application No. PCT/US2020/017968, filed Feb. 12, 2020, which claims the benefit under 35 U.S.C. § 119(e) of U.S. Provisional Application No. 62/804,969, filed Feb. 13, 2019, both of which are hereby incorporated by reference in their entireties.

BACKGROUND

Various embodiments generally may relate to the field of wireless communications.

SUMMARY

Some embodiments of this disclosure include systems, apparatuses, methods, and computer-readable media for use in a wireless network for designing quality report for enhanced Machine Type Communication (EMTC) and Narrowband Internet of Things (NB-IOT).

Some embodiments are directed to a user equipment (UE). The UE includes radio front end circuitry and processor circuitry coupled to the radio front end circuitry. The processor circuitry can be configured to determine a downlink (DL) quality metric based on a DL quality metric type and identify a message 3 (Msg3) signal based on the determined DL quality metric. The processor circuitry can further be configured to transmit, using the radio front circuitry, the identified Msg3 signal to a base station.

Some embodiments are directed to a method. The method includes receiving, by a user equipment (UE), a message 2 (Msg2) signal and determining, by the UE and using the received Msg2 signal, a downlink (DL) quality metric based on a DL quality metric type. The method can further include identifying, by the UE, a message 3 (Msg3) signal based on the determined DL quality metric and transmitting, by the UE, the identified Msg3 signal to a base station.

Some embodiments are directed to a base station. The base station includes radio front end circuitry and processor circuitry coupled to the radio front end circuitry. The processor circuitry can be configured to transmit, using the radio front end circuitry, a message 2 (Msg2) signal to a user equipment (UE) and receive, using the radio front end circuitry, a message 3 (Msg3) signal from the UE. The processor can be further configured to determine, based on the received Msg3 signal, a downlink (DL) quality metric.

BRIEF DESCRIPTION OF THE DRAWINGS/FIGURES

DETAILED DESCRIPTION

Figure 1:
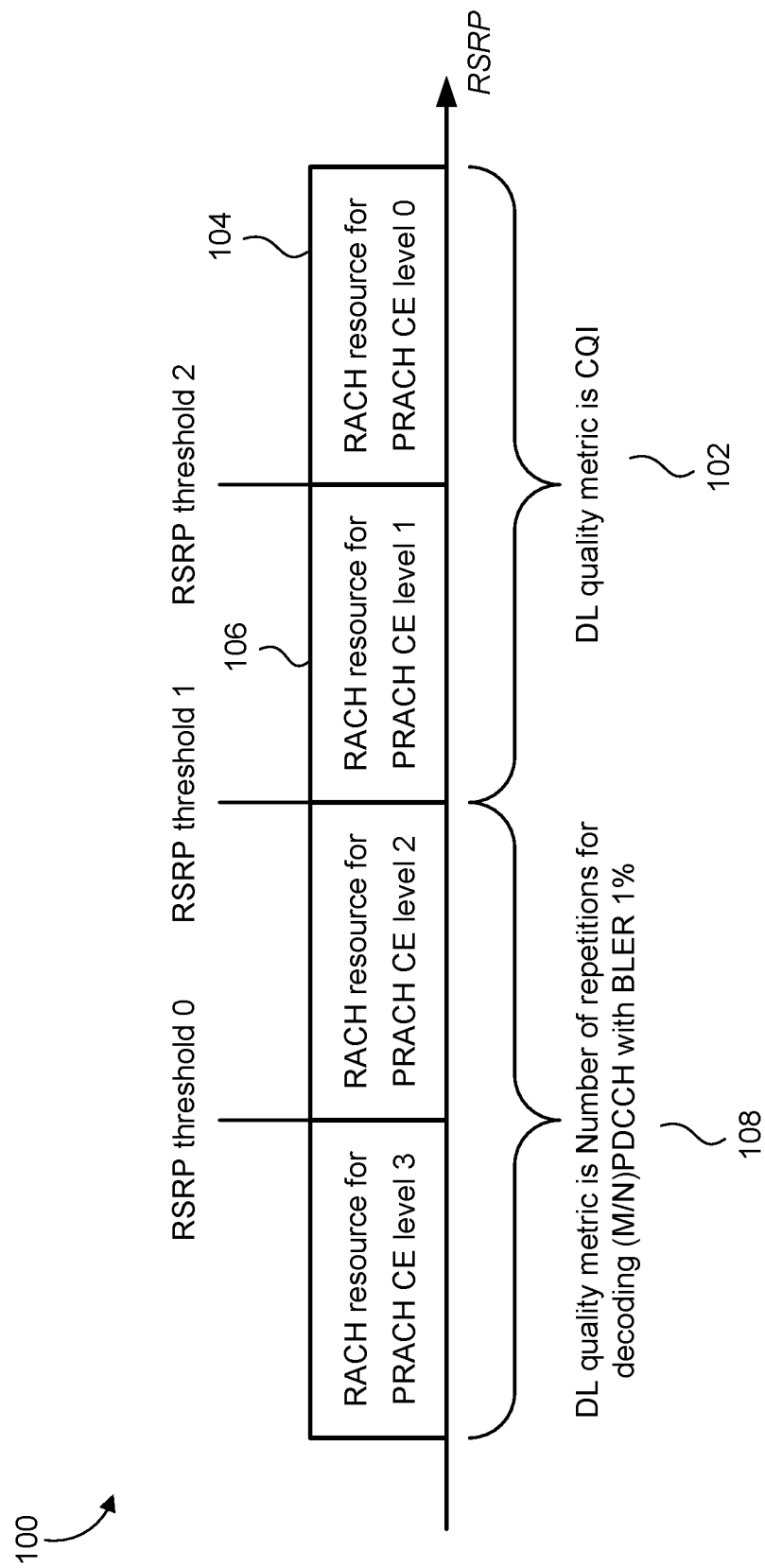
FIG. 1 illustrates an exemplary Physical Random Access Channel (PRACH) Coverage Enhancement (CE) levels and associated downlink (DL) quality metric types, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Embodiments herein may be directed to improve downlink DL transmission efficiency by specifying quality report in Message 3 (Msg3):

improved DL transmission efficiency and/or user equipment (UE) power consumption:
  specify quality report in Msg3 at least for Early Data Transmission (EDT) [RAN1 (Radio Access Network1), RAN2]
improved multi-carrier operation:
  specify support of Msg3 quality reporting for non-anchor access [RAN1, RAN2].

Embodiments described herein may include designs to support the quality report in Msg3 for enhanced Machine Type Communication (eMTC) and the quality report in Msg3 for non-anchor access in Narrowband Internet of Things (NB-IoT).

Embodiments may be directed to the design of quality report in Msg3 for anchor carrier in Release 14 (Rel-14) NB-IoT system. The DL and uplink (UL) noise and interference environment may be quite different in NB-IoT systems. The estimation of DL channel condition only based on Narrowband Physical Random Access Channel (NPRACH) coverage level may not be accurate enough. To provide more accurate information on DL channel condition, it was agreed in Rel-14 NB-IoT systems that the DL channel quality can be reported in Msg3, as an optional feature for Rel-14 NB-IoT UEs. The DL channel quality is denoted as the repetition number that UE needs to decode hypothetical Narrowband Physical Downlink Control Channel (NPDCCH) with Block Error Rate (BLER) of 1%. The indicated hypothetical NPDCCH repetition number is derived based on averaging the DL quality during a period of time to average fading out, without incurring in additional wake-ups for measurement. The reference resource for NPDCCH (i.e., the location in time of the "virtual PDCCH" (virtual Physical Downlink Control Channel)) is not defined. This feature is only supported for anchor carrier on which the UE receives Message 2 (Msg2).

Embodiments disclosed herein may be directed to the design of quality report in Msg3 for eMTC and quality report in Msg3 for non-anchor carrier in NB-IoT. Embodiments may include the design of:
  Quality report definition in terms of which metric to be used.
  Measurement reference resources.
  Msg3 design to carry the quality report.
Configuration and Capability
  Configuration of DL channel quality reporting in Msg3 for eMTC and DL channel quality reporting in Msg3 for non-anchor carrier for NB-IoT can be enabled/disabled by Master Information Block (MIB) or System Information Block (SIB) (as discussed in section "Msg3 design").
  For eMTC, in one example, the SIB1-BR (System Information Block (SIB) Bandwidth Reduced (BR)) or SIBy-BR (y>1) can indicate whether UEs (that support channel quality reporting in Msg3) are expected to include the channel quality measurement report in the Msg3 transmission. Further, the channel quality reported can be specified to correspond to the NB on which the UE receives the Random Access Response (RAR).
  For NB-IoT, in one example, the MIB-NB or SIBx-NB (x=1, 2, etc.) can indicate whether the measurement report is for anchor carrier or non-anchor carrier. Alternatively, it can be up to the UE which carrier the measurement report is for. In this case, the UE can indicate whether the report is for anchor or non-anchor in Msg3. In this case, the non-anchor carrier can be specified to correspond to the non-anchor carrier on which the UE receives the RAR. In another example, when non-anchor carrier is configured for RAR transmission, the UE (that supports channel quality reporting for non-anchor carrier via Msg3) is expected to report DL channel quality corresponding to the non-anchor carrier used to receive RAR transmission. In yet another example, the evolved NodeB (eNB) may configure transmission of channel quality reporting for non-anchor carrier in addition to or instead of the reporting for anchor carrier, applicable for UEs that support channel quality reporting for non-anchor carrier via Msg3.

For UE capability,
  In some embodiments, this feature is optional for Rel-16 NB-IoT/eMTC UEs.
  Alternatively, in some embodiments can be mandatory for Rel-16 NB-IoT/eMTC UEs.
  In some embodiments, the UE can signal their capability regarding the support of measurement report in Msg3 via (N)PRACH (Physical Random Access Channel) partitioning. The partitioning can be in sequence, time and/or frequency domain.
  In some embodiments, the Rel-16 UEs supporting the feature of Early Data Transmission (EDT) should support the channel quality measurement report.
Quality Report Metric
  In some embodiments, the quality report can be defined in terms of (N)RSRP (Reference Signal Received Power) and/or (N)RSRQ (Reference Signal Received Quality). According to some embodiments, The definition of (N)RSRP and (N)RSRQ can be the same as in legacy eMTC/NB-IoT systems. Specifically, the (N)RSRP is the average CRS/NRS (Cell Specific Reference Signal/Narrowband Reference Signal) power on the REs carrying the corresponding reference signal. (N)RSRQ is (N)RSRP divided by (N)RSSI (Received Signal Strength Indicator), where RSSI comprises the linear average power of the OFDM symbols carrying antenna port 0 reference signal for eMTC and NRSSI comprises the linear average of the total received power from all OFDM symbols of measurement subframes for NB-IoT.

In some embodiments, the quality report can be defined as Channel Quality Indicator (CQI). The CQI table for Rel-13 eMTC (with CQI indexes 0-10 in Table 1), or new CQI tables introduced in Rel-15 eMTC (Table 1 and Table 2) can be used. In one embodiment, the CQI table can be Table 2 with only QPSK (Quadrature (Quaternary) Phase Shift Keying) and 16QAM (Quadrature Amplitude Modulation) supported (e.g., CQI indexes 0-10).

In one example, if only QPSK is supported for EDT DL transmission (similar as EDT UL transmission), the CQI table can be Table 1 or Table 2 with only QPSK rows (e.g., CQI indexes from 0 to 7).

In examples where Table 1 is used, the parameter $R^{CSI}$ can be configured by RRC (Radio Resource Control) (e.g., via SIB), or a predefined mapping from $R^{CSI}$ to PRACH coverage level, or a predefined mapping from $R^{CSI}$ to Rmax can be used, where Rmax is the configured maximum number of repetitions for type-2 CSS.

TABLE 1

CQI table 1

| CQI index | modulation | code rate × 1024 × $R^{CSI}$ | efficiency × $R^{CSI}$ |
|---|---|---|---|
| 0 | | out of range | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |

TABLE 1-continued

CQI table 1

| CQI index | modulation | code rate × 1024 × $R^{CSI}$ | efficiency × $R^{CSI}$ |
|---|---|---|---|
| 5  | QPSK   | 308 | 0.6016 |
| 6  | QPSK   | 449 | 0.8770 |
| 7  | QPSK   | 602 | 1.1758 |
| 8  | 16 QAM | 378 | 1.4766 |
| 9  | 16 QAM | 490 | 1.9141 |
| 10 | 16 QAM | 616 | 2.4063 |
| 11 | 64 QAM | 466 | 2.7305 |
| 12 | 64 QAM | 567 | 3.3223 |
| 13 | 64 QAM | 666 | 3.9023 |
| 14 | 64 QAM | 772 | 4.5234 |
| 15 | 64 QAM | 873 | 5.1152 |

TABLE 2

CQI table 2

| CQI index | modulation | code rate × 1024 | repetition |
|---|---|---|---|
| 0  |        | out of range |    |
| 1  | QPSK   | 56  | 32 |
| 2  | QPSK   | 207 | 16 |
| 3  | QPSK   | 266 | 4  |
| 4  | QPSK   | 195 | 2  |
| 5  | QPSK   | 142 | 1  |
| 6  | QPSK   | 266 | 1  |
| 7  | QPSK   | 453 | 1  |
| 8  | 16 QAM | 637 | 1  |
| 9  | 16 QAM | 423 | 1  |
| 10 | 16 QAM | 557 | 1  |
| 11 | 64 QAM | 696 | 1  |
| 12 | 64 QAM | 845 | 1  |
| 13 | 64 QAM | 651 | 1  |
| 14 | 64 QAM | 780 | 1  |
| 15 | 4 QAM  | 888 | 1  |

In some embodiments, the quality report can be defined as the quality report in Msg3 for NB-IoT anchor carrier, e.g., the number of repetitions that the UE needs to decode hypothetical NPDCCH/MPDCCH (MTC Physical Downlink Control CHannel) with BLER of 1%.

The candidates can be defined in terms of the actual NPDCCH/MPDCCH repetition number, e.g., a subset of {1, 2, 4, 8, 16, 32, 64, 128, 192, 256, 384, 512, 1024, 1536, 2048}. In one example, a subset of candidates can be predefined or configured by RRC. The subset of candidates can be different for different (N)PRACH coverage levels.

The candidates can be defined in terms of the scaled Rmax, where Rmax is the maximum number of repetitions configured for type-2 CSS. The set of scaling factors can be predefined or configured by RRC, e.g. {1, ½, ¼, ⅛} or {1, ½, ¼, ⅛, 1/16, 1/32, 1/64, 1/128}. In one example, different sets of scaling factors can be defined/configured for different (N)PRACH coverage levels. In another example, different sets of scaling factors can be defined for different Rmax, e.g. {1, ½, ¼, ⅛} for small Rmax and {1, ¼, ⅛, 1/16} for large Rmax.

The number of repetitions can be the smallest value among the candidate values which satisfies the hypothetical NPDCCH/MPDCCH with BLER no more than 1%. Regarding the assumption for the aggregation levels (AL) to be used for the hypothetical NPDCCH/MPDCCH, the following exemplary embodiments can be considered.

Option 1: The AL can be specified in the specification. For example, AL=2 for NB-IoT and AL=24 for eMTC.

Option 2: The AL can be determined based on the (N)PRACH coverage level. For example, AL=1 for NPRACH coverage level 0, and AL=2 for other NPRACH coverage levels for NB-IoT. For eMTC, one example can be that AL=8 or 16 for PRACH coverage levels 0 and 1, while AL=24 for PRACH coverage levels 2 and 3.

Option 3: The AL can be determined based on the Rmax for type-2 CSS. For example, AL can be 1 for Rmax<N, and AL=2 for Rmax>=N for NB-IoT, where N can be fixed in spec or signaled via SIB. For eMTC, AL=8 for Rmax<N1, AL=16 for N1<=Rmax<N2, and AL=24 for Rmax>=N2, where N1 and N2 can be fixed in spec or signaled via SIB.

Option 4: The AL to be assumed can be signaled via SIB signaling. Furthermore, this could be a single value, or defined as a function of the (N)PRACH coverage level, or defined as a function of Rmax configured for Type-2 CSS for MPDCCH/NPDCCH (for eMTC/NB-IoT respectively), wherein, for the last option, one or more thresholds to divide the entire range of Rmax values may be specified.

For the Downlink Control Information (DCI) format to be assumed for the measurement, the following exemplary embodiments can be considered.

For NB-IoT, the DCI format N1 can be assumed. Alternatively, DCI format N2 can be assumed.

For eMTC:
In one example, a common DCI format can be assumed for all cases. For example, DCI format 6-1A or DCI format 6-1B or DCI format 2 can be assumed.

In one example, different DCI formats can be assumed for different PRACH coverage levels. For example, DCI format 6-1A can be assumed for PRACH coverage levels 0 and 1, while DCI format 6-1B can be assumed for PRACH coverage levels 2 and 3.

In another example, different DCI formats can be assumed for different Rmax configured for Type-2 CSS for MPDCCH. For example, DCI format 6-1A can be assumed for Rmax<=N, while DCI format 6-1B can be assumed for Rmax>N, where N can be fixed in spec (e.g. N=32) or can be signaled via SIB.

For eMTC, regarding the assumption on FH for the hypothetical MPDCCH detection:
In one embodiment, the frequency hopping (FH) is always assumed to be disabled. The (first) NB configured for DCI monitoring in type2-CSS can be the frequency resources for the measurement.

In another embodiment, the FH configuration can be based on the FH configured for type2-CSS.

Note that different embodiments can be used for eMTC and NB-IoT. For example, the quality report in Msg3 for eMTC can be denoted by CQI, while the quality report in Msg3 for non-anchor carrier in NB-IoT can be denoted by the number of repetitions for NPDCCH with BLER of 1%, or vice versa. Alternatively, the same embodiment can be used for both eMTC and NB-IoT, e.g., the quality report in Msg3 for both eMTC and non-anchor carrier in NB-IoT can be denoted by the number of repetitions for NPDCCH/MPDCCH with BLER of 1%.

In some embodiments, either CQI or the number of repetitions for decoding of (M/N)PDCCH with BLER of 1% can be used as the DL quality metric to be reported in Msg3. The distinction between the DL quality metric types (e.g., CQI or the number of (M/N)PDCCH repetitions) is defined as a function of the PRACH CE levels, following Rel-13 approach (FIG. 1). FIG. 1 illustrates an exemplary PRACH CE levels and associated DL quality metric types 100, in accordance to some embodiments. Specifically, the UE reports CQI as the DL quality metric 102 if the PRACH CE level corresponding to the successfully received Msg2 belongs to CE level 0 (104 in FIG. 1) or 1 (106 in FIG. 1), and reports the number of repetitions needed for decoding of hypothetical (M/N)PDCCH with BLER of 1% (108 in FIG. 1), otherwise. According to some embodiments, a unique PRACH resource is associated with a particular PRACH CE level (based on configured RSRP thresholds). This PRACH resource is used by the UE for UL preamble transmission and by the eNB for preamble reception. Therefore, after successful preamble reception, the eNB is aware about what kind of DL quality metric (e.g., CQI or the number of (M/N)PDCCH repetitions) the UE is used in Msg.3 report.

Measurement Reference Resource

In some embodiments, similar to the quality reporting in Msg3 for NB-IoT anchor carrier in Rel-14, the reference resource for the quality measurement is not defined.

In some embodiments, similar to the definition of reference resources for CSI feedback in Rel-13 eMTC, reference resources for channel quality measurements can be defined. The reference resource can span N BL/CE (for eMTC) or NB-IoT (for NB-IoT) DL subframes, where N is a positive integer satisfying N>=1.

For the design of parameter N,
- In one example, the parameter N can be predefined. It can be fixed in spec, or a mapping from N to Rmax can be defined, e.g. N=Rmax/K, where K can be 1, 2, 4, 8, etc. The parameter K can be predefined, or depend on Rmax, e.g. K becomes larger when Rmax increases.
- In one example, the parameter N can be configured by SIB.

For set of subframes as reference resources,
- In one example, the starting subframe of the set of subframes for reference resource can be defined. For example, the first subframe can be M subframes before the first subframe of the type-2 CSS, where M can be non-negative integer such as 0, 2, or 4.
- In one example, the last subframe of the set of subframes for reference resource can be defined. For example, the last subframe can be L subframes before the starting subframe of the Msg3 transmission, where L is positive integer. For example, L can be 4, or L can be the delay between the end of the PDSCH carrying Random Access Response (RAR) to the start of Msg3 transmission. L can be in terms of absolute SFs, or only counting valid DL subframes.
  - In some examples (e.g. for eMTC), L can be 6 for FDD and equal to parameter subframeAssignment for TDD.
  - As another example (e.g. for eMTC), different values for L can be defined, depending on whether UL delay field in RAR is set to 1. Specifically, L can be 6+number of Msg3 repetitions indicated by RAR for FDD and subframeAssignment+number of Msg3 repetitions indicated by RAR for TDD if the UL delay field is set to 1.
  - In yet another example (e.g. for NB-IoT), L can be the 12+D, where D is the delay for Msg3 transmission indicated by RAR.

Different embodiments can be used for eMTC and NB-IoT. For example, for NB-IoT non-anchor case, the reference resource is not defined, while for eMTC, the reference resource is defined based on one of the methods discussed in the second embodiment above.

Regarding frequency resources for the measurement, for NB-IoT, the non-anchor carrier for RAR reception can be defined as the frequency domain resources for measurement. For eMTC, the NB for Type-2 CSS for MPDCCH (for RAR monitoring) can be defined as the frequency domain resources for measurement. If frequency hopping is configured for Type-2 CSS for MPDCCH for RAR, wideband measurement can be reported.

Msg3 Design

Exemplary Scenario #1: eMTC

In some embodiments, for eMTC, measurement is done before the Msg1. In these examples, RRC can get the CE level information or measurement information from MAC before RRC constructs the RRC message and delivers to lower layers. In some embodiments, there is 1 available bit in Msg3. This 1 bit can be used to indicate the quality report. However, with this embodiment, the granularity for the quality report may be quite large, which diminishes the benefits of supporting this feature.

The RRC connection request message, RRC connection resume request message and/or RRC connection reestablishment request message can be extended to larger size, to include an additional IE to carry the quality report.

Exemplary Case #1 when EDT is Used.

In one option, the 1 spare bit can be used to indicate the IE that reports the CQI. This bit is set to 1 to indicate that the RRCConnectionResumeRequest message carries CQI report when initiating EDT. This increases the size of RRC message by one byte. The example below shows the CQI report IE with eight code points.

| RRCConnectionResumeRequest message |
|---|

```
-- ASN1START
RRCConnectionResumeRequest-r13      ::=    SEQUENCE {
    criticalExtensions                         CHOICE {
        rrcConnectionResumeRequest-r13             RRCConnectionResumeRequest-r13-IEs,
        criticalExtensions Future                  SEQUENCE { }
    }
}
RRCConnectionResumeRequest-r13-IEs  ::=    SEQUENCE {
    resumeIdentity-r13                         CHOICE {
        resumeID-r13                               ResumeIdentity-r13,
        truncatedResumeID-r13                      BIT STRING (SIZE (24) )
    },
    shortResumeMAC-I-r13                       BIT STRING (SIZE (16) ),
    resumeCause-r13                            ResumeCause,
    cqi-MPDCCH-r16                                 CQI-MPDCCH-r16
}
```

| RRCConnectionResumeRequest message |
|---|
| ResumeCause ::= ENUMERATED {<br>    emergency, highPriorityAccess, mt-Access, mo-Signalling,<br>    mo-Data, delayTolerantAccess-v1020, mo-VoiceCall-v1280, spare1}<br>CQI-MPDCCH-r16 ::= SEQUENCE {<br>    cqi-MPDCCH-Report-r16 ENUMERATED {<br>        cqi-report1, cqi-report2, cqi-report3, cqi-report4, cqi-report5, cqi-report6, cqi-report7, cqi-report8, spare8, spare7, spare6, spare5, spare4, spare3, spare2, spare1},<br>    spare BIT STRING (SIZE (4) )<br>}<br>-- ASN1STOP |

| RRCConnectionResumeRequest field descriptions |
|---|
| cqi-MPDCCH<br>This field indicates the measured DL channel quality of the serving cell as specified in TS 36.133. This field is present only when used for EDT.<br>resumeCause<br>Provides the resume cause for the RRC connection resume request as provided by the upper layers.<br>resumeIdentity |

| RRCConnectionResumeRequest field descriptions |
|---|
| UE identity to facilitate UE context retrieval at eNB<br>shortResumeMAC-I<br>Authentication token to facilitate UE authentication at eNB |

In another option, a new RRCConnectionResumeRequest IE is defined to carry the CSI report using the critical extension as follows.

| RRCConnectionResumeRequest message |
|---|
| -- ASN1START<br>RRCConnectionResumeRequest-r13 ::= SEQUENCE {<br>    criticalExtensions CHOICE {<br>        rrcConnectionResumeRequest-r13 RRCConnectionResumeRequest-r13-IEs,<br>        criticalExtensionsFuture CHOICE {<br>            rrcConnectionResumeRequest-r16 RRCConnectionResumeRequest-r16-IEs,<br>            criticalExtensionsFuture-r16 SEQUENCE { }<br>        }<br>    }<br>}<br>RRCConnectionResumeRequest-r13-IEs ::= SEQUENCE {<br>    resumeIdentity-r13 CHOICE {<br>        resumeID-r13 ResumeIdentity-r13,<br>        truncatedResumeID-r13 BIT STRING (SIZE (24) )<br>    },<br>    shortResumeMAC-I-r13 BIT STRING (SIZE (16) ),<br>    resumeCause-r13 ResumeCause,<br>    spare BIT STRING (SIZE (1) )<br>}<br>RRCConnectionResumeRequest-r16-IEs ::= SEQUENCE {<br>    resumeID-r16 ResumeIdentity-r13,<br>    shortResumeMAC-I-r16 BIT STRING (SIZE (16) ),<br>    resumeCause-r16 ResumeCause,<br>    cqi-MPDCCH-r16 CQI-MPDCCH-r16,<br>    spare BIT STRING (SIZE (5) )<br>}<br>ResumeCause ::= ENUMERATED {<br>    emergency, highPriorityAccess, mt-Access, mo-Signalling,<br>    mo-Data, delayTolerantAccess-v1020, mo-VoiceCall-v1280, spare1}<br>CQI-MPDCCH-r16 ::= ENUMERATED {<br>    cqi-report1, cqi-report2, cqi-report3, cqi-report4, cqi-report5, cqi-report6, cqi-report7, cqi-report8, spare8, spare7, spare6, spare5, spare4, spare3, spare2, spare1}<br>-- ASN1STOP |

| RRCConnectionResumeRequest field descriptions |
|---|
| cqi-MPDCCH<br>This field indicates the measured DL channel quality of the serving cell as specified in TS 36.133.<br>resumeCause<br>Provides the resume cause for the RRC connection resume request as provided by the upper layers.<br>resumeIdentity<br>UE identity to facilitate UE context retrieval at eNB<br>shortResumeMAC-I<br>Authentication token to facilitate UE authentication at eNB |

In another option, a new RRCConnectionResumeRequest IE is defined to carry the CSI report using the UL-CCCH (uplink Common Control Channel) message class extension as follows.

UL-CCCH-Message

The UL-CCCH-Message class is the set of RRC messages that may be sent from the UE to the E UTRAN on the uplink CCCH logical channel.

Exemplary Option #1

```
-- ASN1START
UL-CCCH-Message   ::=   SEQUENCE {
   message                  UL-CCCH-MessageType
}
UL-CCCH-MessageType   ::=   CHOICE {
   c1                       CHOICE {
      rrcConnectionReestablishmentRequest      RRCConnectionReestablishmentRequest,
      rrcConnectionRequest                     RRCConnectionRequest
   },
   messageClassExtension CHOICE {
      c2                    CHOICE {
         rrcConnectionResumeRequest-r13         RRCConnectionResumeRequest-r13
      },
      messageClassExtensionFuture-r13   CHOICE {
         c3                 CHOICE {
            rrcEarlyDataRequest-r15             RRCEarlyDataRequest-r15,
            spare      NULL
         },
         messageClassExtensionFurther-r15            CHOICE {
            c3                   CHOICE {
               rrcConnectionResumeRequest-r16              RRCConnectionResumeRequest-r16,
               spare         NULL
            },
            messageClassExtensionFurther-r1       SEQUENCE { }
         }
      }
   }
}
-- ASN1STOP
```

Exemplary Option #2

```
-- ASN1START
UL-CCCH-Message   ::=   SEQUENCE {
   message                  UL-CCCH-MessageType
}
UL-CCCH-MessageType   ::=   CHOICE {
   c1                       CHOICE {
      rrcConnectionReestablishmentRequest      RRCConnectionReestablishmentRequest,
      rrcConnectionRequest                     RRCConnectionRequest
   },
   messageClassExtension CHOICE {
      c2                    CHOICE {
         rrcConnectionResumeRequest-r13         RRCConnectionResumeRequest-r13
      },
      messageClassExtensionFuture-r13   CHOICE {
         c3                 CHOICE {
            rrcEarlyDataRequest-r15             RRCEarlyDataRequest-r15,
            rrcConnectionResumeRequest-r16              RRCConnectionResumeRequest-r16
         },
         messageClassExtensionFurther-r15                                     SEQUENCE { }
      }
   }
}
-- ASN1STOP
```

Exemplary Case #2: When EDT is not Used

In a similar way as described in exemplary case #1 for CQI reporting, the RRCConnectionReestablishementRequest or RRCConnectionRequest or RRCConnectionResumeRequest message can be extended to report CQI when EDT is not used, for example:
1. Using UL-CCCH message class extension
2. Or using the critical extension of the message.
3. Or using a spare bit.

However, to let the network know and get sufficient minimum UL grant for Msg3, a UE capability indication signaling can be used. The UE capability indication can be signaled using a PRACH resource via Msg1, then it provides sufficient minimum UL grant for Msg3 in RAR, which is larger than existing minimum UL grant of, for example, 56 bits for LTE (and, for example, 88 bits for NB-IoT). In another option, dedicated RRC signaling can be used to signal the UE capability and network may broadcast in system information if it allows larger grant for Msg3.

In another option, if network supports and intends to receive the CSI report in Msg3, it can broadcast such indication in system information (for example, MIB or SIB2, SIB2-BR or SIB2-NB). This indicates that network would provide minimum sufficient UL grant (for example, 64 bits) in RAR to get CQi report in Msg3 which is larger than existing minimum UL grant of, for example, 56 bits for LTE (or, for example, 96 bits for NB-IoT larger than minimum UL grant of 88 bit).

An example of such indication in system information type 2 is shown below.

| SystemInformationBlockType2 information element |
| --- |
| ```
-- ASN1START
SystemInformationBlockType2    ::=       SEQUENCE  {
    ac-BarringInfo                       SEQUENCE  {
        ac-BarringForEmergency               BOOLEAN,
        ac-BarringForMO-Signalling           AC-BarringConfig              OPTIONAL,  -- Need OP
        ac-BarringForMO-Data                 AC-BarringConfig              OPTIONAL   -- Need OP
    }                                                                      OPTIONAL,  -- Need OP
    radioResourceConfigCommon            RadioResourceConfigCommonSIB,
    ue-TimersAndConstants                UE-TimersAndConstants,
    freqInfo                             SEQUENCE  {
        ul-CarrierFreq                       ARFCN-ValueEUTRA              OPTIONAL,  -- Need OP
        ul-Bandwidth                         ENUMERATED {n6, n15, n25, n50, n75, n100}
                                                                           OPTIONAL,  -- Need OP
        additionalSpectrumEmission           AdditionalSpectrumEmission
    },
    mbsfn-SubframeConfigList             MBSFN-SubframeConfigList          OPTIONAL,  -- Need OR
    timeAlignmentTimerCommon             TimeAlignmentTimer,
    ...,
    lateNonCriticalExtension             OCTET STRING (CONTAINING SystemInformationBlockType2-v8h0-IEs)
                                                                           OPTIONAL,
    [[  ssac-BarringForMMTEL-Voice-r9        AC-BarringConfig              OPTIONAL,  -- Need OP
        ssac-BarringForMMTEL-Video-r9        AC-BarringConfig              OPTIONAL   -- Need OP
    ]],
    [[  ac-BarringForCSFB-r10                AC-BarringConfig              OPTIONAL   -- Need OP
    ]],
    [[  ac-BarringSkipForMMTELVoice-r12      ENUMERATED {true}             OPTIONAL,  -- Need OP
        ac-BarringSkipForMMTELVideo-r12      ENUMERATED {true}             OPTIONAL,  -- Need OP
        ac-BarringSkipForSMS-r12             ENUMERATED {true}             OPTIONAL,  -- Need OP
        ac-BarringPerPLMN-List-r12           AC-BarringPerPLMN-List-r12    OPTIONAL   -- Need OP
    ]],
    [[  voiceServiceCauseIndication-r12      ENUMERATED {true}             OPTIONAL   -- Need OP
    ]],
    [[  acdc-BarringForCommon-r13            ACDC-BarringForCommon-r13     OPTIONAL,  -- Need OP
        acdc-BarringPerPLMN-List-r13         ACDC-BarringPerPLMN-List-r13  OPTIONAL   -- Need OP
    ]],
    [[
        udt-RestrictingForCommon-r13         UDT-Restricting-r13           OPTIONAL,  -- Need OR
        udt-RestrictingPerPLMN-List-r13      UDT-RestrictingPerPLMN-List-r13  OPTIONAL,  -- Need OR
        cIoT-EPS-OptimisationInfo-r13        CIOT-EPS-OptimisationInfo-r13 OPTIONAL,  -- Need OP
        useFullResumeID-r13                  ENUMERATED {true}             OPTIONAL   -- Need OP
    ]],
``` |

-continued

| SystemInformationBlockType2 information element | | | |
|---|---|---|---|
| [ [ unicastFreqHoppingInd-r13 | ENUMERATED {true} | OPTIONAL | -- Need OP |
| ] ], | | | |
| [ [ mbsfn-SubframeConfigList-v1430 | MBSFN-SubframeConfigList-v1430 | OPTIONAL, -- Need OP | |
| videoServiceCauseIndication-r14 | ENUMERATED {true} | OPTIONAL | -- Need OP |
| ] ], | | | |
| [ [ plmn-InfoList-r15 | PLMN-InfoList-r15 | OPTIONAL | -- Need OP |
| ] ], | | | |
| [ [ reducedCP-LatencyEnabled-r15 | ENUMERATED {true} | OPTIONAL, | -- Need OR |
| cp-EDT-r15 | ENUMERATED {true} | OPTIONAL, | -- Need OP |
| up-EDT-r15 | ENUMERATED {true} | OPTIONAL, | -- Need OP |
| idleModeMeasurements-r15 | ENUMERATED {true} | OPTIONAL | -- Need OR |
| ] ] | | | |
| [ [ cqi-ReportAllowed-r16 | ENUMERATED {true} | OPTIONAL | -- Need OR |
| ] ] | | | |
| } | | | | cp-EDT

This field indicates if the UE is allowed to initiate CP-EDT, see 5.3.3.1b.

cqi-ReportAllowed

This field indicates that the eNB can process the CQI report in Msg3.

idleModeMeasurements

This field indicates that the eNB can process indication of IDLE mode measurements from UE.

An example of using a new RRCConnectionResumeRequest IE to carry the CSI report using the critical extension is as follows.

| RRCConnectionResumeRequest message |
|---|
| -- ASN1START |
| RRCConnectionResumeRequest-r13    ::=    SEQUENCE { |
|     criticalExtensions                                      CHOICE { |
|         rrcConnectionResumeRequest-r13                      RRCConnectionResumeRequest-r13-IEs, |
|         criticalExtensionsFuture                            CHOICE { |
|             rrcConnectionResumeRequest-r16                  RRCConnectionResumeRequest-r16-IEs, |
|             criticalExtensionsFuture-r16                    SEQUENCE { } |
|         } |
|     } |
| } |
| RRCConnectionResumeRequest-r13-IEs    ::=    SEQUENCE { |
|     resumeIdentity-r13                                      CHOICE { |
|         resumeID-r13                                        ResumeIdentity-r13, |
|         truncatedResumeID-r13                               BIT STRING (SIZE (24) ) |
|     }, |
|     shortResumeMAC-I-r13                                    BIT STRING (SIZE (16) ), |
|     resumeCause-r13                                         ResumeCause, |
|     spare                                                   BIT STRING (SIZE (1) ) |
| } |
| RRCConnectionResumeRequest-r16-IEs    ::=    SEQUENCE { |
|     resumeIdentity-r13                                      CHOICE { |
|         resumeID-r13                                        ResumeIdentity-r13, |
|         truncatedResumeID-r13                               BIT STRING (SIZE (24) ) |
|     }, |
|     shortResumeMAC-I-r16                                    BIT STRING (SIZE (16) ), |
|     resumeCause-r16                                         ResumeCause, |
|     cqi-MPDCCH-r16                                          CQI-MPDCCH-r16, |
|     spare                                                   BIT STRING (SIZE (4) ) |
| } |
| ResumeCause    ::=    ENUMERATED { |
|                         emergency, highPriorityAccess, mt-Access, mo-Signalling, |
|                         mo-Data, delayTolerantAccess-v1020, mo-VoiceCall-v1280, spare1} |

-continued

RRCConnectionResumeRequest message

CQI-MPDCCH-r16  ::=          ENUMERATED  {
                                          cqi-report1, cqi-report2, cqi-report3,
cqi-report4, cqi-report5, cqi-report6, cqi-report7, cqi-report8, spare8, spare7,
spare6, spare5, spare4, spare3, spare2, spare1}
-- ASN1STOP In some embodiments, UE performs the channel quality measurement from Msg2 (RAR message). In one option, MAC indicates to RRC to construct new RRC message to include the latest measurement report from Msg2. It is also indicated that there will be sufficient gap between Msg2 and Msg3 to build a new RRC message.

Figure 2:
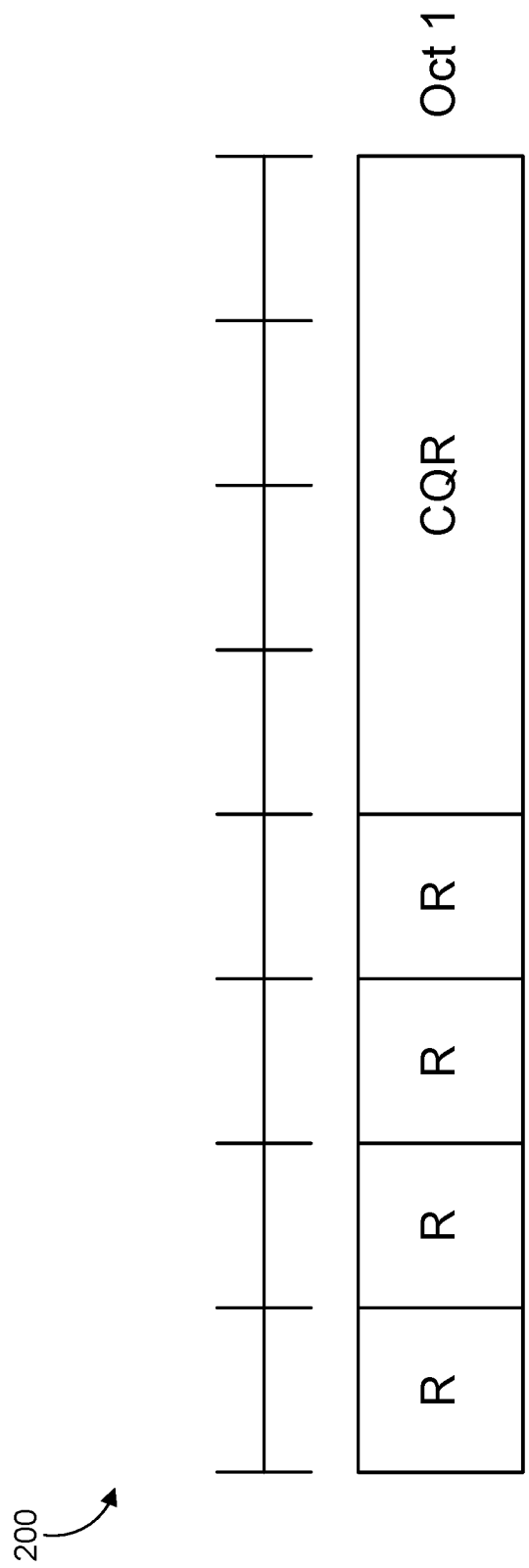
FIG. 2 illustrates an exemplary Channel Quality Report (CQR) Medium Access Control (MAC) Control Element (CE), in accordance with some embodiments.

In another option, if the UL grant in RAR is sufficient to include a MAC CE (i.e., larger than or equal to 64 bits or when EDT is used), it instructs the multiplexing and assembly unit to generate a channel quality report (CQR) MAC CE to include it in the MAC PDU for Msg3. The example of channel quality report (CQR) MAC CE 200 is shown in FIG. 2.

Figure 3:
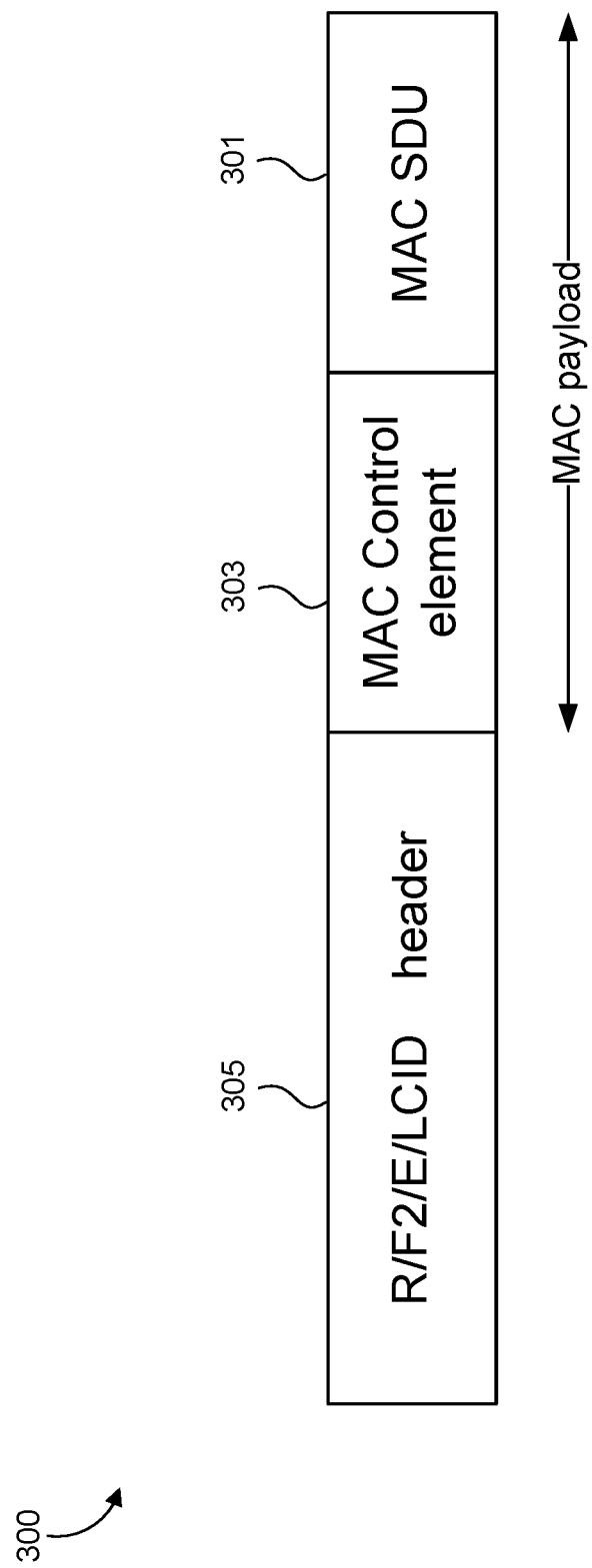
FIG. 3 illustrates an exemplary MAC Protocol Data Unit (PDU) including a Common Control Channel (CCCH) Service Data Unit (SDU) and CQR MAC CE, in accordance to some embodiments.

Once the network receives the CQR MAC CE, MAC layer can indicate to upper layer (RRC layer) about the information contained in the CQR MAC CE. FIG. 3 illustrates an exemplary MAC Protocol Data Unit (PDU) 300 including a CCCH SDU (Service Data Unit) 301 and CQR MAC CE 303, in accordance to some embodiments. In one option, the one byte MAC CE 303 is placed before the CCCH SDU 301 without any MAC CE subheader for Msg3. It is identified by the Logical Channel ID (LCID) of the CCCH SDU. In some examples, it can be mandatory to use together with CCCH SDU 301 to be identified by existing CCCH LCID 305, as shown in FIG. 3 or it can be optional to be identified by using a reserved LCID as indicated in Table 3.

TABLE 3

(E.g., Table 6.2.1-2 Values of
LCID for UL-SCH in TS 36.331)

| Codepoint/Index | LCID values |
| --- | --- |
| 00000 | CCCH |
| 00001-01010 | Identity of the logical channel |
| 01011 | CCCH |
| 01100 | CCCH |
| 01101 | CCCH and Extended Power Headroom Report |
| 01110 | CCCH and Channel Quality Report |
| 01111 | Reserved |
| 10000 | Extended logical channel ID field |
| 10001 | Reserved |
| 10010 | AUL confirmation (4 octets) |
| 10011 | AUL confirmation (1 octet) |
| 10100 | Recommended bit rate query |
| 10101 | SPS confirmation |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In another option, the CQR MAC CE can be included in the MAC PDU (in front of the CCCH SDU) to be sent in Msg3 with a separate MAC CE subheader, which is identified by using a reserved LCID. An example is shown in the Table 4.

TABLE 4

(E.g., Table 6.2.1-2 Values of LCID
for UL-SCH in TS 36.331)

| Codepoint/Index | LCID values |
| --- | --- |
| 00000 | CCCH |
| 00001-01010 | Identity of the logical channel |
| 01011 | CCCH |
| 01100 | CCCH |
| 01101 | CCCH and Extended Power Headroom Report |
| 01110 | Channel Quality Report |
| 01111 | Reserved |
| 10000 | Extended logical channel ID field |
| 10001 | Reserved |
| 10010 | AUL confirmation (4 octets) |
| 10011 | AUL confirmation (1 octet) |
| 10100 | Recommended bit rate query |
| 10101 | SPS confirmation |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Reporting Repetitions Level (RL) and Aggregation Level (AL)

Following is agreed in RAN1 #95.

1. For CE Mode B, the downlink channel quality reported in Msg3 is denoted as the repetition number that the UE recommends to achieve a hypothetical MPDCCH decoding BLER of 1%;

2. For CE mode A (PRACH CE level 0, 1), the downlink channel quality is the repetition number and/or aggregation level that the UE needs to decode hypothetical MPDCCH with BLER of 1%;

The number of repetition levels (RL) that can be reported for MPDCCH (MTC Physical Downlink Control Channel) is 1, 2, 4, 8, 16, 32, 64, 128 and 256. The number of aggregation levels (AL) that can be reported for MPDCCH is 8, 16 and 24.

In one option, 8 code points for RL can be use as {R12=1 or 2, R4=4, R8=8, R16=16, R32=32, R64=64, R128=128 and R256=256). Or in another option it can be {R1=Rmax/128, R2=Rmax/64, R3=Rmax/32, R4=Rmax/16, R5=Rmax/8, R6=Rmax/4, R7=Rmax/2 and R8=Rmax). Four codepoints for AL can be reported as {AL0=no reporting, AL1=8, AL2=16, AL3=24}.

If RRC message is used to report, RL and RL can be included together with/without information of narrowbands where this measurement was taken. If information of narrowband is not included, then when frequency hopping is not enabled, reporting corresponds to MPDCCH for monitoring paging narrowband (PNB) or for receiving RAR.

MAC CE 408 indicating further the NB offset to determine NM where measurement is taken, according to some embodiments. An additional bit can be used to indicate if

```
RRCConnectionResumeRequest-r16-IEs    ::=    SEQUENCE {
    resumeIdentity-r13                        CHOICE {
        resumeID-r13                              ResumeIdentity-r13,
        truncatedResumeID-r13                     BIT STRING (SIZE (24) )
    },
    shortResumeMAC-I-r16                          BIT STRING (SIZE (16) ),
    resumeCause-r16                               ResumeCause,
    repetitionLevel                           ENUMERATED  {r1or2, r4, r8, r16, r32, r64,
r128, r256},
    aggregationLevel                          ENUMERATED  {AG0, AG1, AG2, AG3}
        spare                                     BIT STRING (SIZE (3) )
}
```

In another option, Msg4 is can be scheduled in a NB, which is mapped directly from paging NB. In system information, an offset to paging narrowband is provided. This indicates that eNB wants UE to prepare measurement in that NB where Msg4 transmission will probably be scheduled. If offset is not included, the UE will prepare the report corresponding to PNB or NB for RAR.

When frequency hopping is enabled, UE can either prepare the average or best or worst of RLs and ALs of all the hopped NBs. If UE is preparing the worst or best RLs and ALs of the NB, it may also include the offset to the NB indicated by mpdcch-NarrowbandsToMonitor in SIB2 for RAR and NB is identified as $(NB_{RAR}+\text{offset}) \mod N_{NB}$ where $NB_{RAR}$ is NB for RAR and $N_{NB}$ is total number of NBs.

repetition field is present or not in case UE wants to report only aggregation level. Or four bits can be used for repetition level to report one of the 9 codepoints for repetition levels (1, 2, 4, 8, 16, 32, 64, 128 and 256) plus one code point for "no reporting" and reserved code points for future.

In another option, 2 unused bits in MAC subheader can be used. This could be 1 reserved bit is set to "1" to indicate "F2" field and "E" field are used to report 2 bits of Msg3 quality report when UL grant is small (e.g., 56 bits) and length indicator is not required or additional MAC CE or SDU is not included (e.g., UL grant is sufficient to transmit only RRCConnectionRequest message or RRCConnectionResumeRequest message or RRCConnectionReestablishmentRequest message). In this case, even 3 unused bits can also be used one "R" field, "F2" field and "E" field. In

```
RRCConnectionResumeRequest-r16-IEs    ::=    SEQUENCE {
    resumeIdentity-r13                        CHOICE {
        resumeID-r13                              ResumeIdentity-r13,
        truncatedResumeID-r13                     BIT STRING (SIZE (24) )
    },
    shortResumeMAC-I-r16                          BIT STRING (SIZE (16) ),
    resumeCause-r16                               ResumeCause,
    repetitionLevel-MPDCCH-r16                ENUMERATED  { R1, R2, R3, R4, R5, R6, R7,
R8 }
    aggregationLevel-MPDCCH-r16               ENUMERATED  {AG0, AG1, AG2, AG3},
    offset-NB-r16                             ENUMERATED  {0, 1, 2, 3, 4, 5, 6, 7}
}
```

If average report from the measurements of multiple NBs is to be prepared, an indication can be used to indicate the report is average of NBs or of a single NB. When preparing average value, the average value can be rounded up or down to one of the closest reporting values. (e.g., average value 10 is reported as 8 but average value 14 is reported as 16). In another option, further indication that report is prepared for the NB used to receive the RAR or for the NB indicated by RAR can also be included in the report.

Figure 4:
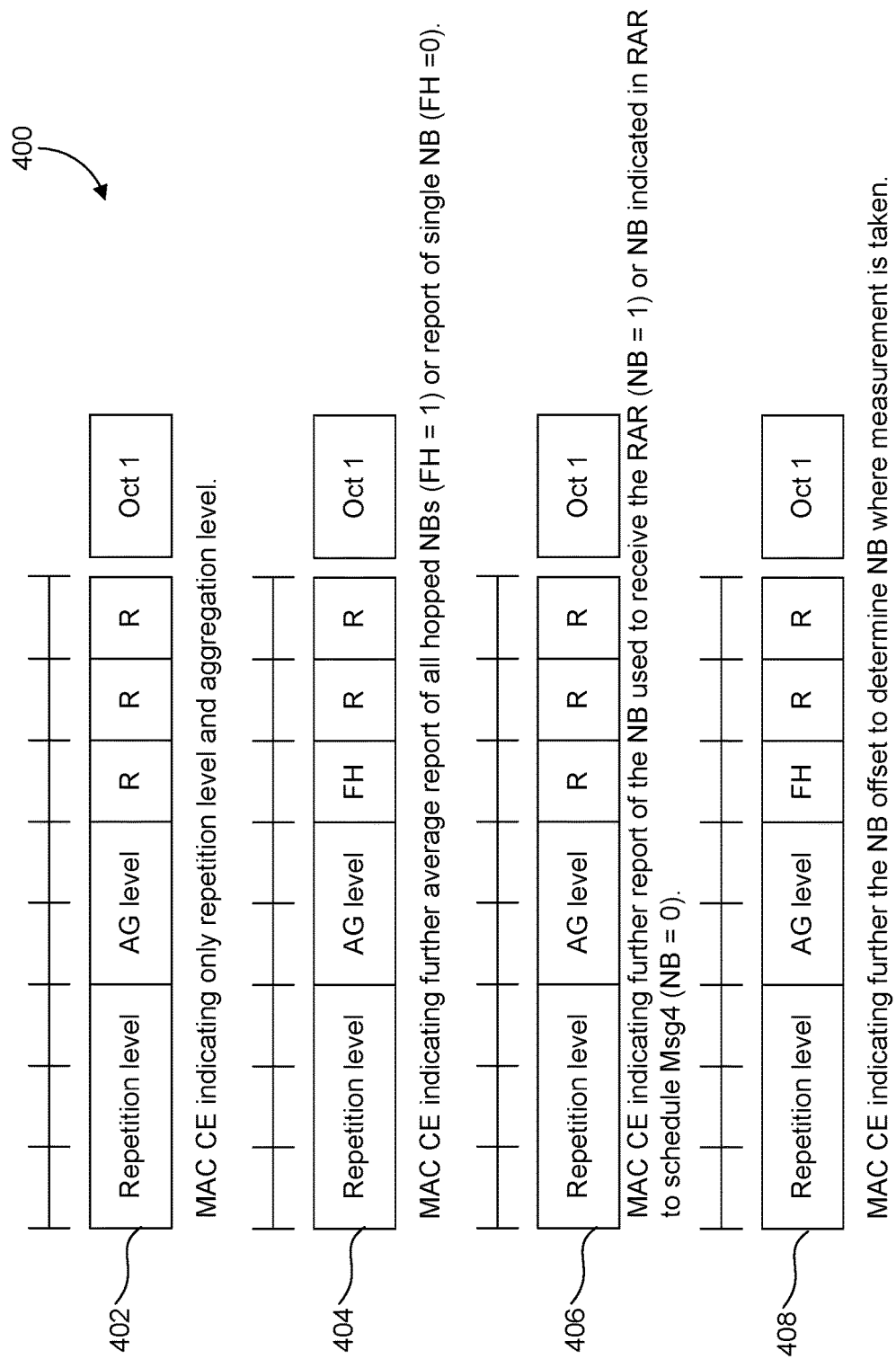
FIG. 4 illustrates exemplary MAC CEs, in accordance to some embodiments.

In another option, a MAC CE can be used for this purpose. An example of 1 byte MAC CE 400 is illustrated in FIG. 4. For example, FIG. 4 illustrates MAC CE 402 indicating only repetition level and aggregation level, according to some embodiment. FIG. 4 also illustrates MAC CE 404 indicating further average report of all hopped NBs (FH=1) or report of a single NB (FH=0), according to some embodiments. FIG. 4 also illustrates MAC CE 406 indicating further report of the NB used to receive the RAR (NB=1) or the NB indicated in RAR to schedule Msg4 (NB=0), according to some embodiments. FIG. 4 also illustrates another option, the only the last MAC subheader is used for this purpose. For example, if a MAC PDU has three MAC CEs (one for CCCH SDU, one for BSR MAC CE and one for padding), the "R" field in the first two MAC subheader is set to "0" as in legacy where as in the last MAC subheader, "R" field is set to "1" to carry two bits of report from the "F2" and "E" fields.

When there is fallback due to legacy UL grant in both EDT case or non-EDT case (e.g., legacy UL grant which cannot carry the channel quality report), 2 unused bits in MAC sub-header when sending CCCH SDU can be used to report one of four code points (R1=Rmax/8, R1=Rmax/4, R1=Rmax/2 and R1=Rmax) of repetition level in CE mode B (e.g., when PRACH CE level 2 or 3 is used) or one of the four code points (R1=Rmax/128, R2=Rmax/64, R3=Rmax/32, R4=Rmax/16) of repetition level in CE mode A (i.e., when PRACH CE level 0 or 1 is used).

Repetition levels set for 2 bits report can be defined for each PRACH CE level used in Msg1, an example is shown in Table below.

| PRACH CE level used in Msg1 | Repetition levels set for 2 bits report (fout code points) |
| --- | --- |
| 0 | 1, 2, 4, 8 |
| 1 | 4, 8, 16, 32 |
| 2 | 16, 32, 64, 128 |
| 3 | 32, 64, 128, 256 |

A new reserved LCID can be used if 2 bits of quality report plus one CCCH SDU together with short BSR. In another option, it could be padding bits or truncated BSR in place of short BSR.

Exemplary Scenario #2: NB-IoT

In some embodiments, for NB-IoT, there are at least 3 spare bits in Msg3. Similar to the quality report for anchor-carrier in NB-IoT, the spare bits can be used to carry quality report for non-anchor case. Currently NB-IoT UE only provides the serving cell measurement report in Anchor carrier. However, when UE initiates RACH procedure, the selection of PRACH resource in anchor or non-anchor carrier selection depends on the probability configured by nprach-ProbabilityAnchor.

In one option, measurement is done before Msg1 and RRC message includes the channel quality report to be sent in Msg3. In this case, one spare bit in the RRC message can be used to indicate that the existing report cqi-NPDCCH carries report for Anchor carrier or non-anchor carrier. In another option, the RRC message can be extended (using UL CCCH message class extension or critical extension of RRC message or extension using a spare bit) in the similar way described for eMTC in the previous embodiments. Whether or not UE needs to provide the channel quality report for non-Anchor carrier can be indicated by network via broadcast message. For this purpose, a spare bit in MIB can be used or it can be indicate in SIB2-NB.

In another option, measurement is done using NPDCCH for the Msg2. The UL grant for Msg3 is provided sufficiently large and gap between Msg2 and Msg3 is provided sufficiently long to be enough for the measurement and indicate to upper layers (RRC layers) to construct a new extended RRC message including the measurement report and deliver the RRC message to lower layer for transmission.

In this option, a new RRC and MAC interaction model can be defined as follows. Similar RRC and MAC interaction modeling can also be applicable to eMTC.

If network has indicated in broadcast (MIB or SIB2-NB) message that channel quality report measured for Msg2 is allowed to be sent in Msg3 or is processed, then RRC delays the construction of RRC message.

First, it indicates MAC layer to initiate the random access procedure.

MAC layer initiates the RACH procedure by selecting the appropriate PRACH resource for selected CE level and carrier (Anchor or non-anchor carrier).

When UE receives the RAR intended for it, MAC layers indicates the RRC layer about the measurement report.

The RRC layer constructs a new extended RRC message for RRC connection establishment including the measurement report provided by the MAC layer and delivers to MAC layer for transmission.

The RRC message can be extended using UL CCCH message class extension or critical extension of RRC message or extension using a spare bit.

In another option, a spare bit in the RRC message is set to "1" to indicate the existing field "cqi-NPDCCH" in the RRC message includes the report for non-anchor DL carrier used to start RACH.

In another option, a spare bit in the RRC message is set to "1" to indicate the existing field "cqi-NPDCCH" in the RRC message includes the report for same DL carrier used for Msg2.

In another option, a new channel quality report (CQR) MAC CE can be defined and included in the MAC PDU mandatorily in front of CCCH SDU together DPR MAC CE to be sent in Msg3. This increases the minimum required UL grant size from, for example, 88 bits to, for example, 96 bits. In another option, the CQR MAC CE can be optionally included in the MAD PDU (i.e. when UL grant size is equal to or greater than 96 bits) by using a reserved LCID to identify the MAC header for CCCH and DPR (or extended DPR) MAC CE and CQR MAC CE.

In another option, a new reserved LCID can be used in the MAC CE subheader to identify the CQR MAC CE to be multiplexed with CCCH SDU.

Measurement Resources

In some embodiments, the measurement resources are not restricted, and it is up to UE implementation regarding which DL subframes to be measured.

In some embodiments, the measurement resources can be defined similar as in Rel-14 NB-IoT. For example, there can be two measurement periods:

T1: period used for (N)RSRP estimation for (N)PRACH CE level decision, or period before NPRACH transmission for non-anchor NB-IoT case.

T2: period from the beginning of Msg2 reception to the beginning of Msg3 transmission.

Either T1 or T2 can be defined for the measurement, or alternatively it is up to UE implementation to use T1 and/or T2. If T1 is used for NB-IoT non-anchor case, a measurement gap can be defined to allow UEs to switch to the non-anchor carrier for measurement before NPRACH transmission. For T2, a gap can be defined between Msg2 and Msg3 to allow sufficient time for UEs to construct the measurement report, especially for the cases where the measurement report is carried in RRC message which needs to be re-constructed.

Exemplary Methods to Determine the Msg3 TBS

For the systems that support DL quality report in Msg3, the following embodiments can be considered regarding the TBS for Msg3.

In some embodiments, if the UE signals the capability to support DL quality report (e.g., via (N)PRACH), the eNB would schedule a larger Msg3 TBS for the UEs support the DL quality report to accommodate the number of bits for DL quality report.

In some embodiments, for the cases where eNB is not aware of UE capability regarding the DL quality report, the eNB can always schedule a larger Msg3 TBS if DL quality report in Msg3 is supported. The UEs not supporting the DL quality report may transmit padding bits to fit the scheduled TBS.

In some embodiments, for the cases where eNB is not aware of UE capability regarding the DL quality report, the eNB can schedule both the Msg3 TBS with and without DL quality report, and it can be up to UE to select which TBS to be used depending on whether the DL quality report is transmitted. In this case, eNB would blindly detect whether UE carries the DL quality report.

For the resource allocation,

In one example of this embodiment, the allocated resources can be the same for Msg3 with and without DL quality report, considering that the number of additional bits for the quality report may be quite small compared to the number of bits for Msg3 without DL quality report, especially for EDT case.

In another example, frequency domain resources can be the same for Msg3 with and without DL quality report, while the number of repetitions can be scaled depending on the different TBSs. Denote the TBS for Msg3 without DL quality report by T1, and the TBS for Msg3 with DL quality report by T2. The number of repetitions indicated by the UL grant in the RAR can be applied to the Msg3 without DL quality report, denoted by R. The number of repetitions for Msg3 with DL quality report can be the value from the supported number of repetitions which is closest to and no less than ceil(T2/T1*R).

For modulation scheme and number of RUs in NB-IoT network, they can follow what is indicated by UL grant in RAR for both Msg3 with and without DL quality report.

For EDT cases, as eNB already needs to perform blindly detection for up to 4 possible TBSs for Msg3 with EDT and without DL quality report, to reduce the complexity at eNB side, when DL quality report is supported, the number of TBS to be selected by UEs considering EDT and DL quality report can be limited to up to 4. For example, based on the maximum TBS broadcasted by the SIB for EDT without DL quality report, denoted by TBS0, a smaller TBS TBS1 can be defined (e.g. TBS1 can be the supported TBS closed to TBS0/2 or TBS1 can be selected from the agreed TBS table for EDT in Rel-15 eMTC/NB-IoT), and TBS0 and TBS1 can be selected by UEs who does not support DL quality report, while TBS0' and TBS1' can be selected by the UEs who will transmit DL quality report in Msg3, where TBS0' and TBS1' can be predefined based on TBS0. In some examples, for certain TBS0, there may not exist TBS1 (e.g. when TBS0=328 bits). In this case, UE can select either TBS0 or TBS0' depending on whether DL quality report is carried in Msg3 by the UE.

For the retransmission, the UE uses the same TBS as previous transmission of Msg3 scheduled by RAR. The number of repetitions can be scaled in the same way as for the initial transmission.

The DCI format for scheduling retransmission of Msg3 can be used to indicate UE to transmit a legacy Msg3 to fallback to non-DL quality report Msg3 transmission.

For NB-IoT, one example is that the DCI format indicates TBS of 88 bits, which implies that the transmission of Msg3 fallback to legacy Msg3 without EDT and without DL quality report.

For eMTC, as an alternative to the above option, one unused MCS state can be used to indicate the fallback without DL quality report. For EDT case, two unused states can be used, one for fallback without DL quality report but with EDT, and the other for fallback with DL quality and without EDT. The unused state for EDT to fallback to legacy Msg3 in Rel-15 eMTC can be reused to indicate fallback without DL quality report and without EDT.

Systems and Implementations

Figure 5:
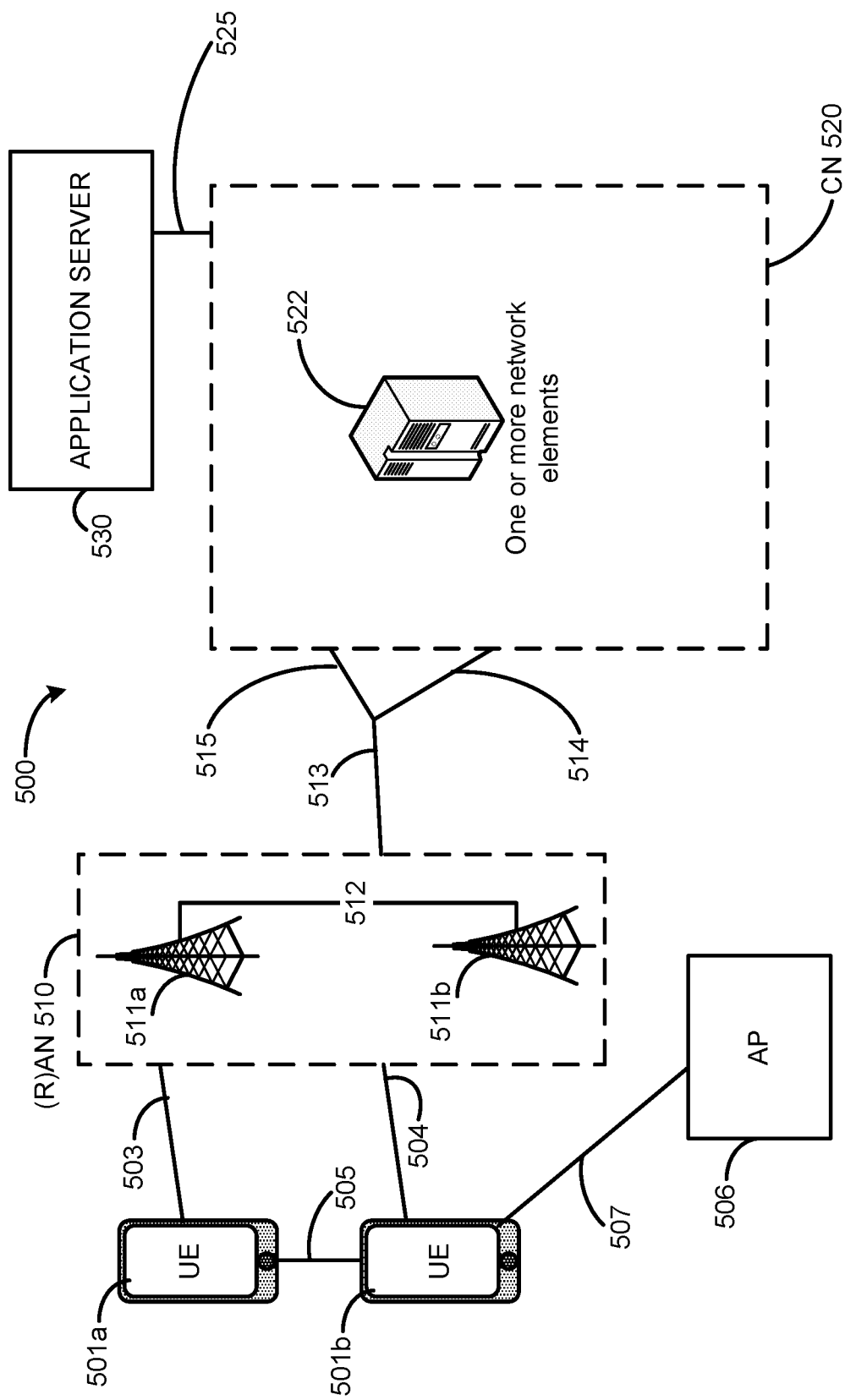
FIG. 5 depicts an architecture of a system of a network, in accordance with some embodiments.

FIG. 5 illustrates an example architecture of a system 500 of a network, in accordance with various embodiments. The following description is provided for an example system 500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 5, the system 500 includes UE 501a and UE 501b (collectively referred to as "UEs 501" or "UE 501"). In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 501 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 may be configured to connect, for example, communicatively couple, with an or RAN 510. In embodiments, the RAN 510 may be an NG RAN or a 5G RAN, an E-UTRAN, or a legacy RAN, such as a UTRAN or GERAN. As used herein, the term "NG RAN" or the like may refer to a RAN 510 that operates in an NR or 5G system 500, and the term "E-UTRAN" or the like may refer to a RAN 510 that operates in an LTE or 4G system 500. The UEs 501 utilize connections (or channels) 503 and 504, respectively, each of which comprises a physical communications interface or layer (discussed in further detail below).

In this example, the connections 503 and 504 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 501 may directly exchange communication data via a ProSe interface 505. The ProSe interface 505 may alternatively be referred to as a SL interface 505 and may comprise one or more logical channels, including but not limited to a PSCCH, a PSSCH, a PSDCH, and a PSBCH.

The UE 501b is shown to be configured to access an AP 506 (also referred to as "WLAN node 506," "WLAN 506," "WLAN Termination 506," "WT 506" or the like) via connection 507. The connection 507 can comprise a local wireless connection, such as a connection consistent with any IEEE 802.11 protocol, wherein the AP 506 would comprise a wireless fidelity (Wi-Fi®) router. In this example, the AP 506 is shown to be connected to the Internet without connecting to the core network of the wireless system (described in further detail below). In various embodiments, the UE 501*b*, RAN 510, and AP 506 may be configured to utilize LWA operation and/or LWIP operation. The LWA operation may involve the UE 501*b* in RRC_CONNECTED being configured by a RAN node 511*a-b* to utilize radio resources of LTE and WLAN. LWIP operation may involve the UE 501*b* using WLAN radio resources (e.g., connection 507) via IPsec protocol tunneling to authenticate and encrypt packets (e.g., IP packets) sent over the connection 507. IPsec tunneling may include encapsulating the entirety of original IP packets and adding a new packet header, thereby protecting the original header of the IP packets.

The RAN 510 can include one or more AN nodes or RAN nodes 511*a* and 511*b* (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as BS, gNBs, RAN nodes, eNB s, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 511 that operates in an NR or 5G system 500 (for example, a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 511 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 511; a MAC/PHY split wherein RRC, PDCP, RLC, and MAC layers are operated by the CRAN/vBBUP and the PHY layer is operated by individual RAN nodes 511; or a "lower PHY" split wherein RRC, PDCP, RLC, MAC layers and upper portions of the PHY layer are operated by the CRAN/vBBUP and lower portions of the PHY layer are operated by individual RAN nodes 511. This virtualized framework allows the freed-up processor cores of the RAN nodes 511 to perform other virtualized applications. In some implementations, an individual RAN node 511 may represent individual gNB-DUs that are connected to a gNB-CU via individual F1 interfaces (not shown by FIG. 5). In these implementations, the gNB-DUs may include one or more remote radio heads or RFEMs (see, e.g., FIG. 8), and the gNB-CU may be operated by a server that is located in the RAN 510 (not shown) or by a server pool in a similar manner as the CRAN/vBBUP. Additionally or alternatively, one or more of the RAN nodes 511 may be next generation eNBs (ng-eNBs), which are RAN nodes that provide E-UTRA user plane and control plane protocol terminations toward the UEs 501, and are connected to a 5GC (e.g., CN 720 of FIG. 7) via an NG interface (discussed infra).

In V2X scenarios one or more of the RAN nodes 511 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 501 (vUEs 501). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using OFDM communication signals with each other or with any of the RAN nodes 511 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 501a, 501b and the RAN nodes 511a, 511b communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 501a, 501b and the RAN nodes 511a, 511b may operate using LAA, eLAA, and/or feLAA mechanisms. In these implementations, the UEs 501a, 501b and the RAN nodes 511a, 511b may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 501a, 501b, RAN nodes 511a, 511b, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 501a or 501b, AP 506, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds ($\mu$s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 501a, 501b to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 501. The PDCCH carries information about the transport format and resource allocations related to the PDSCH channel, among other things. It may also inform the UEs 501 about the transport format, resource allocation, and HARQ information related to the uplink shared channel. Typically, downlink scheduling (assigning control and shared channel resource blocks to the UE 501b within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 511 may be configured to communicate with one another via interface 512. In embodiments where the system 500 is an LTE system (e.g., when CN 520 is an EPC 620 as in FIG. 6), the interface 512 may be an X2 interface 512. The X2 interface may be defined between two or more RAN nodes 511 (e.g., two or more eNBs and the like) that connect to EPC 520, and/or between two eNBs connecting to EPC 520. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system (e.g., when CN 520 is an 5GC 720 as in FIG. 7), the interface 512 may be an Xn interface 512. The Xn interface is defined between two or more RAN nodes 511 (e.g., two or more gNBs and the like) that connect to 5GC 520, between a RAN node 511 (e.g., a gNB) connecting to 5GC 520 and an eNB, and/or between two eNBs connecting to 5GC 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CM-CONNECTED) including functionality to manage the UE mobility for connected mode between one or more RAN nodes 511. The mobility support may include context transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a core network—in this embodiment, core network (CN) 520. The CN 520 may comprise a plurality of network elements 522, which are configured to offer various data and telecommunications services to customers/subscribers (e.g., users of UEs 501) who are connected to the CN 520 via the RAN 510. The components of the CN 520 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS PS domain, LTE PS data services, etc.). The application server 530 can also be configured to support one or more communication services (e.g., VoIP sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a UPF, and the S1 control plane (NG-C) interface 515, which is a signaling interface between the RAN nodes 511 and AMFs. Embodiments where the CN 520 is a 5GC 520 are discussed in more detail with regard to FIG. 7.

In embodiments, the CN 520 may be a 5G CN (referred to as "5GC 520" or the like), while in other embodiments, the CN 520 may be an EPC). Where CN 520 is an EPC (referred to as "EPC 520" or the like), the RAN 510 may be connected with the CN 520 via an S1 interface 513. In embodiments, the S1 interface 513 may be split into two parts, an S1 user plane (S1-U) interface 514, which carries traffic data between the RAN nodes 511 and the S-GW, and the S1-MME interface 515, which is a signaling interface between the RAN nodes 511 and MMEs. An example architecture wherein the CN 520 is an EPC 520 is shown by FIG. 6.

Figure 6:
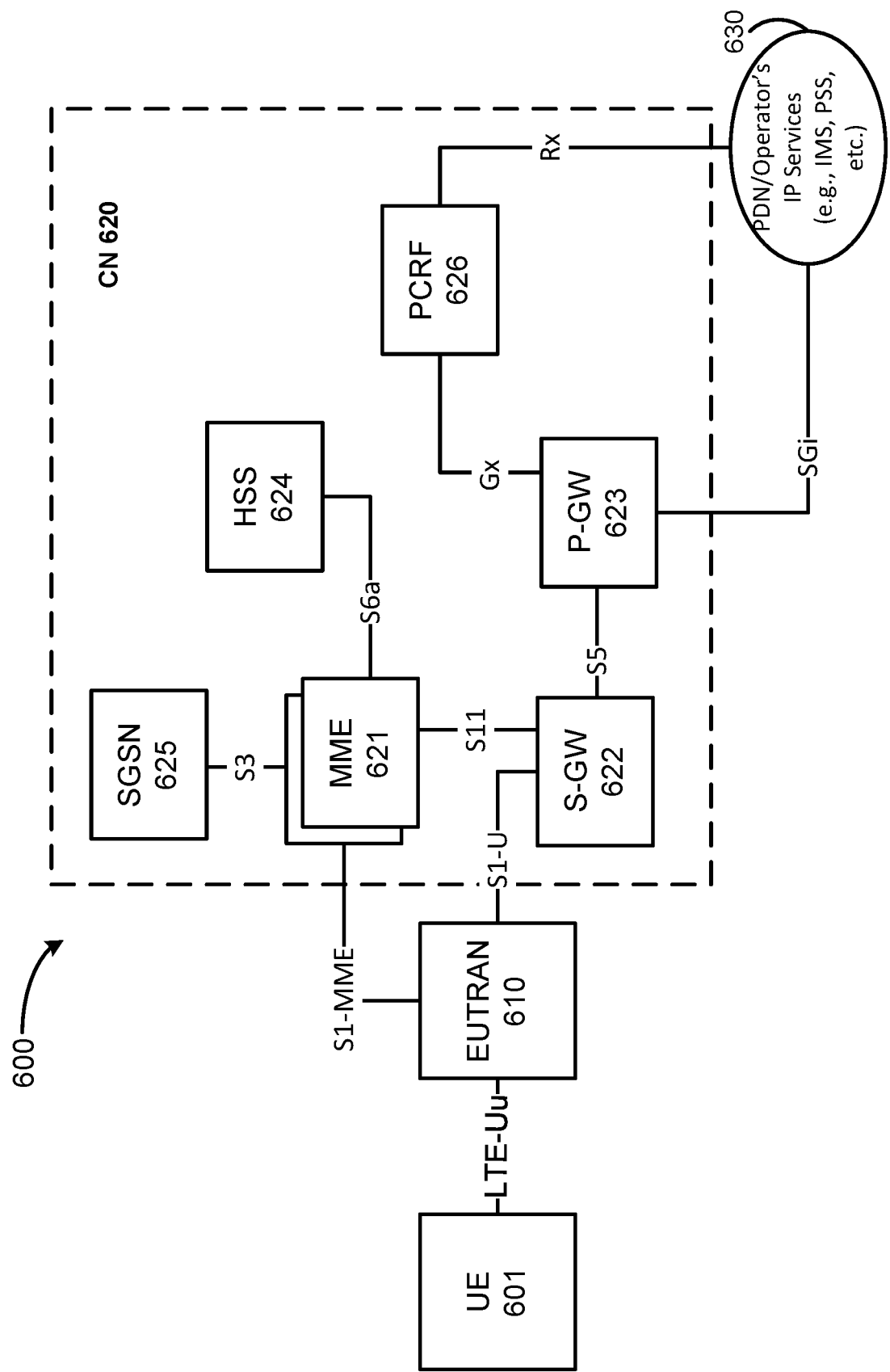
FIG. 6 depicts an architecture of a system including a first core network, in accordance with some embodiments.

FIG. 6 illustrates an example architecture of a system 600 including a first CN 620, in accordance with various embodiments. In this example, system 600 may implement the LTE standard wherein the CN 620 is an EPC 620 that corresponds with CN 520 of FIG. 5. Additionally, the UE 601 may be the same or similar as the UEs 501 of FIG. 5, and the E-UTRAN 610 may be a RAN that is the same or similar to the RAN 510 of FIG. 5, and which may include RAN nodes 511 discussed previously. The CN 620 may comprise MMEs 621, an S-GW 622, a P-GW 623, a HSS 624, and a SGSN 625.

The MMEs 621 may be similar in function to the control plane of legacy SGSN, and may implement MM functions to keep track of the current location of a UE 601. The MMEs 621 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 601, provide user identity confidentiality, and/or perform other like services to users/subscribers. Each UE 601 and the MME 621 may include an MM or EMM sublayer, and an MM context may be established in the UE 601 and the MME 621 when an attach procedure is successfully completed. The MM context may be a data structure or database object that stores MM-related information of the UE 601. The MMEs 621 may be coupled with the HSS 624 via an S6a reference point, coupled with the SGSN 625 via an S3 reference point, and coupled with the S-GW 622 via an S11 reference point.

The SGSN 625 may be a node that serves the UE 601 by tracking the location of an individual UE 601 and performing security functions. In addition, the SGSN 625 may perform Inter-EPC node signaling for mobility between 2G/3G and E-UTRAN 3GPP access networks; PDN and S-GW selection as specified by the MMEs 621; handling of UE 601 time zone functions as specified by the MMEs 621; and MME selection for handovers to E-UTRAN 3GPP access network. The S3 reference point between the MMEs 621 and the SGSN 625 may enable user and bearer information exchange for inter-3GPP access network mobility in idle and/or active states.

The HSS 624 may comprise a database for network users, including subscription-related information to support the network entities' handling of communication sessions. The EPC 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc. An S6a reference point between the HSS 624 and the MMES 621 may enable transfer of subscription and authentication data for authenticating/authorizing user access to the EPC 620 between HSS 624 and the MMES 621.

The S-GW 622 may terminate the S1 interface 513 ("S1-U" in FIG. 6) toward the RAN 610, and routes data packets between the RAN 610 and the EPC 620. In addition, the S-GW 622 may be a local mobility anchor point for inter-RAN node handovers and also may provide an anchor for inter-3GPP mobility. Other responsibilities may include lawful intercept, charging, and some policy enforcement. The S11 reference point between the S-GW 622 and the MMES 621 may provide a control plane between the MMES 621 and the S-GW 622. The S-GW 622 may be coupled with the P-GW 623 via an S5 reference point.

The P-GW 623 may terminate an SGi interface toward a PDN 630. The P-GW 623 may route data packets between the EPC 620 and external networks such as a network including the application server 530 (alternatively referred to as an "AF") via an IP interface 525 (see e.g., FIG. 5). In embodiments, the P-GW 623 may be communicatively coupled to an application server (application server 530 of FIG. 5 or PDN 630 in FIG. 6) via an IP communications interface 525 (see, e.g., FIG. 5). The S5 reference point between the P-GW 623 and the S-GW 622 may provide user plane tunneling and tunnel management between the P-GW 623 and the S-GW 622. The S5 reference point may also be used for S-GW 622 relocation due to UE 601 mobility and if the S-GW 622 needs to connect to a non-collocated P-GW 623 for the required PDN connectivity. The P-GW 623 may further include a node for policy enforcement and charging data collection (e.g., PCEF (not shown)). Additionally, the SGi reference point between the P-GW 623 and the packet data network (PDN) 630 may be an operator external public, a private PDN, or an intra operator packet data network, for example, for provision of IMS services. The P-GW 623 may be coupled with a PCRF 626 via a Gx reference point.

PCRF 626 is the policy and charging control element of the EPC 620. In a non-roaming scenario, there may be a single PCRF 626 in the Home Public Land Mobile Network (HPLMN) associated with a UE 601's Internet Protocol Connectivity Access Network (IP-CAN) session. In a roaming scenario with local breakout of traffic, there may be two PCRFs associated with a UE 601's IP-CAN session, a Home PCRF (H-PCRF) within an HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate QoS and charging parameters. The PCRF 626 may provision this rule into a PCEF (not shown) with the appropriate TFT and QCI, which commences the QoS and charging as specified by the application server 630. The Gx reference point between the PCRF 626 and the P-GW 623 may allow for the transfer of QoS policy and charging rules from the PCRF 626 to PCEF in the P-GW 623. An Rx reference point may reside between the PDN 630 (or "AF 630") and the PCRF 626.

Figure 7:
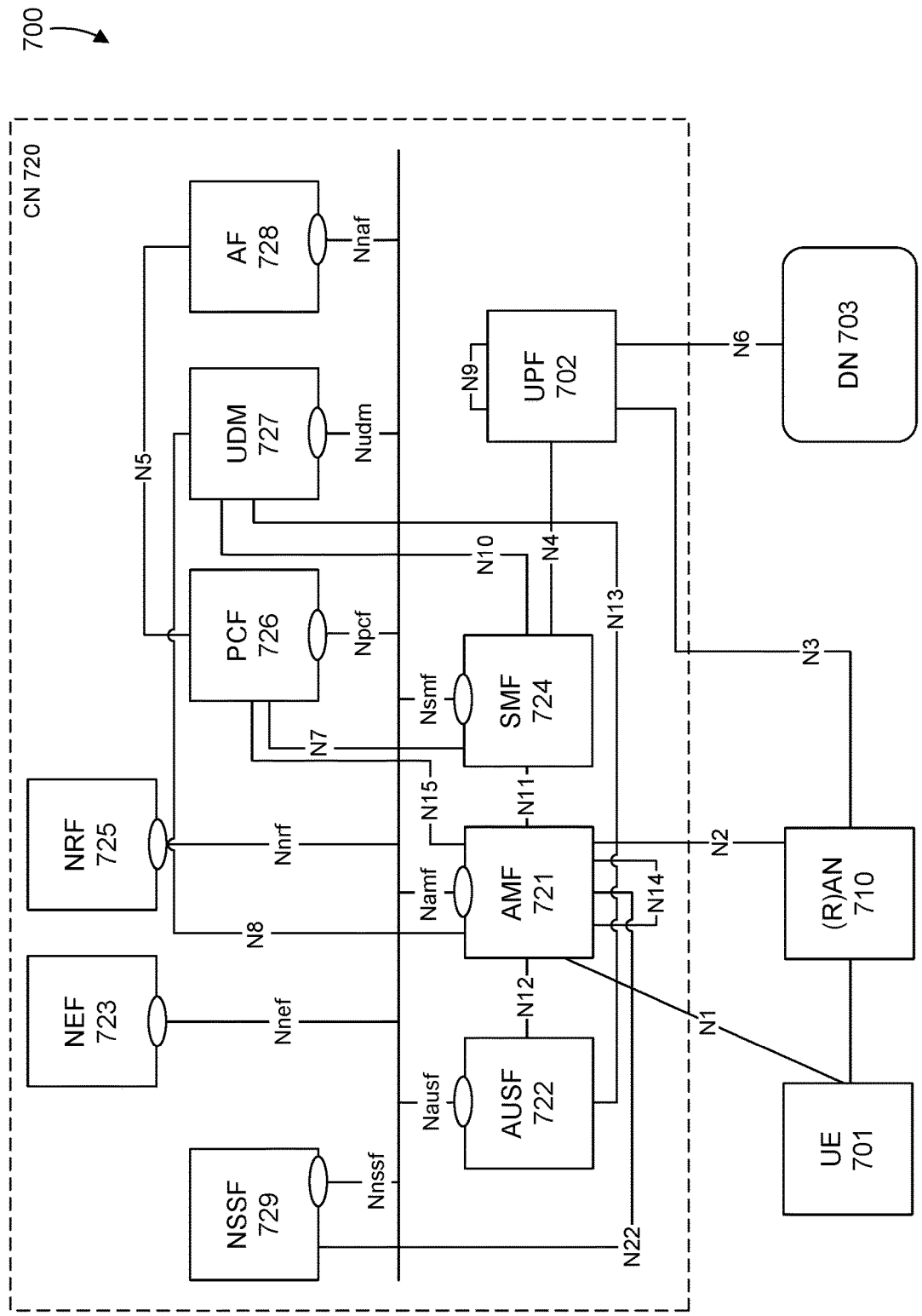
FIG. 7 depicts an architecture of a system including a second core network in accordance with some embodiments.

FIG. 7 illustrates an architecture of a system 700 including a second CN 720 in accordance with various embodiments. The system 700 is shown to include a UE 701, which may be the same or similar to the UEs 501 and UE 601 discussed previously; a (R)AN 710, which may be the same or similar to the RAN 510 and RAN 610 discussed previously, and which may include RAN nodes 511 discussed previously; and a DN 703, which may be, for example, operator services, Internet access or 3rd party services; and a 5GC 720. The 5GC 720 may include an AUSF 722; an AMF 721; a SMF 724; a NEF 723; a PCF 726; a NRF 725; a UDM 727; an AF 728; a UPF 702; and a NSSF 729.

The UPF 702 may act as an anchor point for intra-RAT and inter-RAT mobility, an external PDU session point of interconnect to DN 703, and a branching point to support multi-homed PDU session. The UPF 702 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 702 may include an uplink classifier to support routing traffic flows to a data network. The DN 703 may represent various network operator services, Internet access, or third party services. DN 703 may include, or be similar to, application server 530 discussed previously. The UPF 702 may interact with the SMF 724 via an N4 reference point between the SMF 724 and the UPF 702.

The AUSF 722 may store data for authentication of UE 701 and handle authentication-related functionality. The AUSF 722 may facilitate a common authentication framework for various access types. The AUSF 722 may communicate with the AMF 721 via an N12 reference point between the AMF 721 and the AUSF 722; and may communicate with the UDM 727 via an N13 reference point between the UDM 727 and the AUSF 722. Additionally, the AUSF 722 may exhibit an Nausf service-based interface.

The AMF 721 may be responsible for registration management (e.g., for registering UE 701, etc.), connection management, reachability management, mobility management, and lawful interception of AMF-related events, and access authentication and authorization. The AMF 721 may be a termination point for the an N11 reference point between the AMF 721 and the SMF 724. The AMF 721 may provide transport for SM messages between the UE 701 and the SMF 724, and act as a transparent proxy for routing SM messages. AMF 721 may also provide transport for SMS messages between UE 701 and an SMSF (not shown by FIG. 7). AMF 721 may act as SEAF, which may include interaction with the AUSF 722 and the UE 701, receipt of an intermediate key that was established as a result of the UE 701 authentication process. Where USIM based authentication is used, the AMF 721 may retrieve the security material from the AUSF 722. AMF 721 may also include a SCM function, which receives a key from the SEA that it uses to derive access-network specific keys. Furthermore, AMF 721 may be a termination point of a RAN CP interface, which may include or be an N2 reference point between the (R)AN 710 and the AMF 721; and the AMF 721 may be a termination point of NAS (N1) signalling, and perform NAS ciphering and integrity protection.

AMF 721 may also support NAS signalling with a UE 701 over an N3 IWF interface. The N3IWF may be used to provide access to untrusted entities. N3IWF may be a termination point for the N2 interface between the (R)AN 710 and the AMF 721 for the control plane, and may be a termination point for the N3 reference point between the (R)AN 710 and the UPF 702 for the user plane. As such, the AMF 721 may handle N2 signalling from the SMF 724 and the AMF 721 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 701 and AMF 721 via an N1 reference point between the UE 701 and the AMF 721, and relay uplink and downlink user-plane packets between the UE 701 and UPF 702. The N3IWF also provides mechanisms for IPsec tunnel establishment with the UE 701. The AMF 721 may exhibit an Namf service-based interface, and may be a termination point for an N14 reference point between two AMFs 721 and an N17 reference point between the AMF 721 and a 5G-EIR (not shown by FIG. 7).

The UE 701 may need to register with the AMF 721 in order to receive network services. RM is used to register or deregister the UE 701 with the network (e.g., AMF 721), and establish a UE context in the network (e.g., AMF 721). The UE 701 may operate in an RM-REGISTERED state or an RM-DEREGISTERED state. In the RM-DEREGISTERED state, the UE 701 is not registered with the network, and the UE context in AMF 721 holds no valid location or routing information for the UE 701 so the UE 701 is not reachable by the AMF 721. In the RM-REGISTERED state, the UE 701 is registered with the network, and the UE context in AMF 721 may hold a valid location or routing information for the UE 701 so the UE 701 is reachable by the AMF 721. In the RM-REGISTERED state, the UE 701 may perform mobility Registration Update procedures, perform periodic Registration Update procedures triggered by expiration of the periodic update timer (e.g., to notify the network that the UE 701 is still active), and perform a Registration Update procedure to update UE capability information or to re-negotiate protocol parameters with the network, among others.

The AMF 721 may store one or more RM contexts for the UE 701, where each RM context is associated with a specific access to the network. The RM context may be a data structure, database object, etc. that indicates or stores, inter alia, a registration state per access type and the periodic update timer. The AMF 721 may also store a 5GC MM context that may be the same or similar to the (E)MM context discussed previously. In various embodiments, the AMF 721 may store a CE mode B Restriction parameter of the UE 701 in an associated MM context or RM context. The AMF 721 may also derive the value, when needed, from the UE's usage setting parameter already stored in the UE context (and/or MM/RM context).

CM may be used to establish and release a signaling connection between the UE 701 and the AMF 721 over the N1 interface. The signaling connection is used to enable NAS signaling exchange between the UE 701 and the CN 720, and comprises both the signaling connection between the UE and the AN (e.g., RRC connection or UE-N3IWF connection for non-3GPP access) and the N2 connection for the UE 701 between the AN (e.g., RAN 710) and the AMF 721. The UE 701 may operate in one of two CM states, CM-IDLE mode or CM-CONNECTED mode. When the UE 701 is operating in the CM-IDLE state/mode, the UE 701 may have no NAS signaling connection established with the AMF 721 over the N1 interface, and there may be (R)AN 710 signaling connection (e.g., N2 and/or N3 connections) for the UE 701. When the UE 701 is operating in the CM-CONNECTED state/mode, the UE 701 may have an established NAS signaling connection with the AMF 721 over the N1 interface, and there may be a (R)AN 710 signaling connection (e.g., N2 and/or N3 connections) for the UE 701. Establishment of an N2 connection between the (R)AN 710 and the AMF 721 may cause the UE 701 to transition from CM-IDLE mode to CM-CONNECTED mode, and the UE 701 may transition from the CM-CONNECTED mode to the CM-IDLE mode when N2 signaling between the (R)AN 710 and the AMF 721 is released.

The SMF 724 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 701 and a data network (DN) 703 identified by a Data Network Name (DNN). PDU sessions may be established upon UE 701 request, modified upon UE 701 and 5GC 720 request, and released upon UE 701 and 5GC 720 request using NAS SM signaling exchanged over the N1 reference point between the UE 701 and the SMF 724. Upon request from an application server, the 5GC 720 may trigger a specific application in the UE 701. In response to receipt of the trigger message, the UE 701 may pass the trigger message (or relevant parts/information of the trigger message) to one or more identified applications in the UE 701.

The identified application(s) in the UE 701 may establish a PDU session to a specific DNN. The SMF 724 may check whether the UE 701 requests are compliant with user subscription information associated with the UE 701. In this regard, the SMF 724 may retrieve and/or request to receive update notifications on SMF 724 level subscription data from the UDM 727.

The SMF 724 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 724 may be included in the system 700, which may be between another SMF 724 in a visited network and the SMF 724 in the home network in roaming scenarios. Additionally, the SMF 724 may exhibit the Nsmf service-based interface.

The NEF 723 may provide means for securely exposing the services and capabilities provided by 3GPP network functions for third party, internal exposure/re-exposure, Application Functions (e.g., AF 728), edge computing or fog computing systems, etc. In such embodiments, the NEF 723 may authenticate, authorize, and/or throttle the AFs. NEF 723 may also translate information exchanged with the AF 728 and information exchanged with internal network functions. For example, the NEF 723 may translate between an AF-Service-Identifier and an internal 5GC information. NEF 723 may also receive information from other network functions (NFs) based on exposed capabilities of other network functions. This information may be stored at the NEF 723 as structured data, or at a data storage NF using standardized interfaces. The stored information can then be re-exposed by the NEF 723 to other NFs and AFs, and/or used for other purposes such as analytics. Additionally, the NEF 723 may exhibit an Nnef service-based interface.

The NRF 725 may support service discovery functions, receive NF discovery requests from NF instances, and provide the information of the discovered NF instances to the NF instances. NRF 725 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 725 may exhibit the Nnrf service-based interface.

The PCF 726 may provide policy rules to control plane function(s) to enforce them, and may also support unified policy framework to govern network behaviour. The PCF 726 may also implement an FE to access subscription information relevant for policy decisions in a UDR of the UDM 727. The PCF 726 may communicate with the AMF 721 via an N15 reference point between the PCF 726 and the AMF 721, which may include a PCF 726 in a visited network and the AMF 721 in case of roaming scenarios. The PCF 726 may communicate with the AF 728 via an N5 reference point between the PCF 726 and the AF 728; and with the SMF 724 via an N7 reference point between the PCF 726 and the SMF 724. The system 700 and/or CN 720 may also include an N24 reference point between the PCF 726 (in the home network) and a PCF 726 in a visited network. Additionally, the PCF 726 may exhibit an Npcf service-based interface.

The UDM 727 may handle subscription-related information to support the network entities' handling of communication sessions, and may store subscription data of UE 701. For example, subscription data may be communicated between the UDM 727 and the AMF 721 via an N8 reference point between the UDM 727 and the AMF. The UDM 727 may include two parts, an application FE and a UDR (the FE and UDR are not shown by FIG. 7). The UDR may store subscription data and policy data for the UDM 727 and the PCF 726, and/or structured data for exposure and application data (including PFDs for application detection, application request information for multiple UEs 701) for the NEF 723. The Nudr service-based interface may be exhibited by the UDR 221 to allow the UDM 727, PCF 726, and NEF 723 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 724 via an N10 reference point between the UDM 727 and the SMF 724. UDM 727 may also support SMS management, wherein an SMS-FE implements the similar application logic as discussed previously. Additionally, the UDM 727 may exhibit the Nudm service-based interface.

The AF 728 may provide application influence on traffic routing, provide access to the NCE, and interact with the policy framework for policy control. The NCE may be a mechanism that allows the 5GC 720 and AF 728 to provide information to each other via NEF 723, which may be used for edge computing implementations. In such implementations, the network operator and third party services may be hosted close to the UE 701 access point of attachment to achieve an efficient service delivery through the reduced end-to-end latency and load on the transport network. For edge computing implementations, the 5GC may select a UPF 702 close to the UE 701 and execute traffic steering from the UPF 702 to DN 703 via the N6 interface. This may be based on the UE subscription data, UE location, and information provided by the AF 728. In this way, the AF 728 may influence UPF (re)selection and traffic routing. Based on operator deployment, when AF 728 is considered to be a trusted entity, the network operator may permit AF 728 to interact directly with relevant NFs. Additionally, the AF 728 may exhibit an Naf service-based interface.

The NSSF 729 may select a set of network slice instances serving the UE 701. The NSSF 729 may also determine allowed NSSAI and the mapping to the subscribed S-NS-SAIs, if needed. The NSSF 729 may also determine the AMF set to be used to serve the UE 701, or a list of candidate AMF(s) 721 based on a suitable configuration and possibly by querying the NRF 725. The selection of a set of network slice instances for the UE 701 may be triggered by the AMF 721 with which the UE 701 is registered by interacting with the NSSF 729, which may lead to a change of AMF 721. The NSSF 729 may interact with the AMF 721 via an N22 reference point between AMF 721 and NSSF 729; and may communicate with another NSSF 729 in a visited network via an N31 reference point (not shown by FIG. 7). Additionally, the NSSF 729 may exhibit an Nnssf service-based interface.

As discussed previously, the CN 720 may include an SMSF, which may be responsible for SMS subscription checking and verification, and relaying SM messages to/from the UE 701 to/from other entities, such as an SMS-GMSC/IWMSC/SMS-router. The SMS may also interact with AMF 721 and UDM 727 for a notification procedure that the UE 701 is available for SMS transfer (e.g., set a UE not reachable flag, and notifying UDM 727 when UE 701 is available for SMS).

The CN 120 may also include other elements that are not shown by FIG. 7, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 7). Individual NFs may share a UDSF for storing their respective unstructured data or individual NFs may each have their own UDSF located at or near the individual NFs. Additionally, the UDSF may exhibit an Nudsf service-based interface (not shown by FIG. 7). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 7 for clarity. In one example, the CN 720 may include an Nx interface, which is an inter-CN interface between the MME (e.g., MME 621) and the AMF 721 in order to enable interworking between CN 720 and CN 620. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 8:
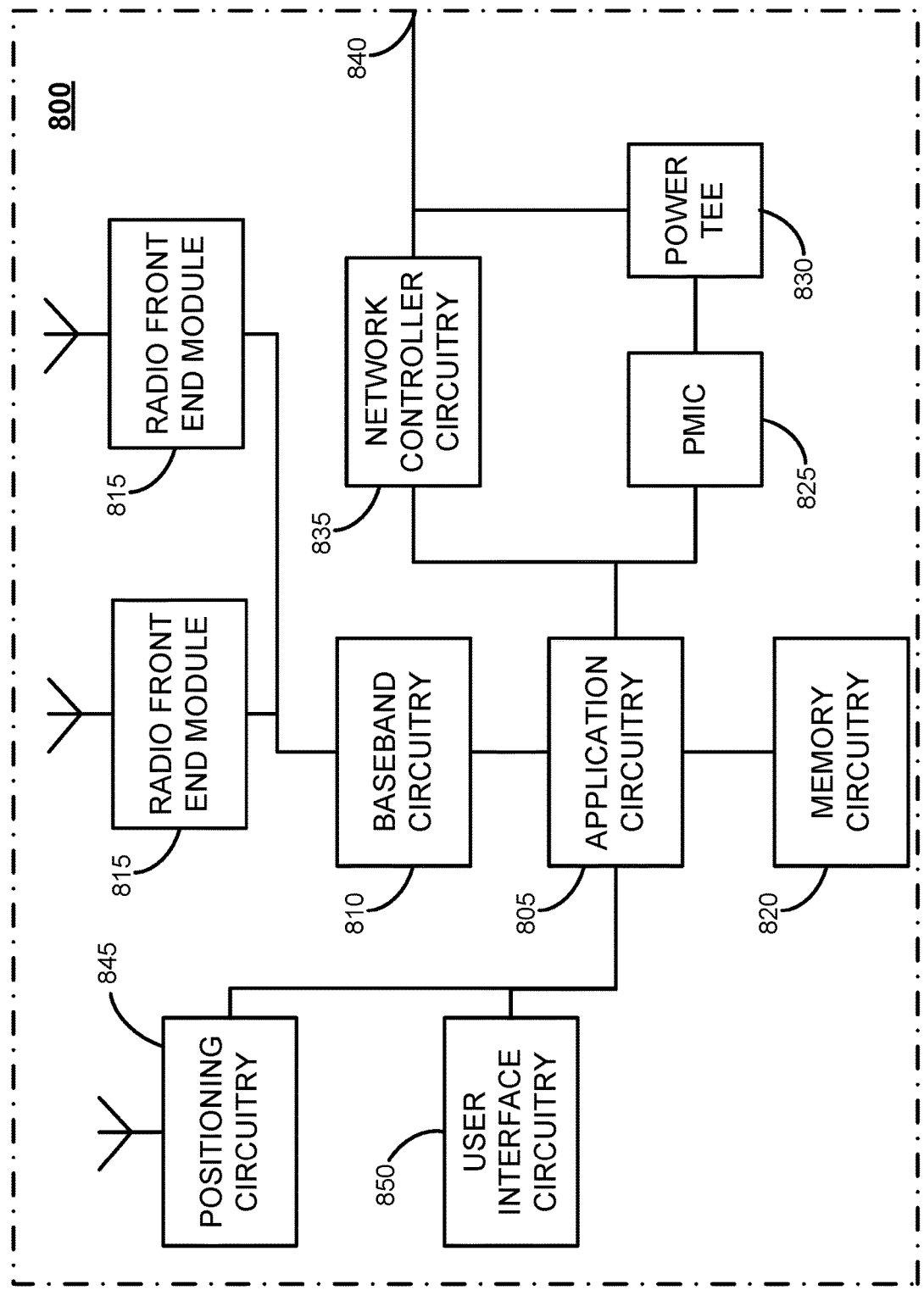
FIG. 8 depicts an example of infrastructure equipment, in accordance with various embodiments.

FIG. 8 illustrates an example of infrastructure equipment 800 in accordance with various embodiments. The infrastructure equipment 800 (or "system 800") may be implemented as a base station, radio head, RAN node such as the RAN nodes 511 and/or AP 506 shown and described previously, application server(s) 530, and/or any other element/device discussed herein. In other examples, the system 800 could be implemented in or by a UE.

The system 800 includes application circuitry 805, baseband circuitry 810, one or more radio front end modules (RFEMs) 815, memory circuitry 820, power management integrated circuitry (PMIC) 825, power tee circuitry 830, network controller circuitry 835, network interface connector 840, satellite positioning circuitry 845, and user interface 850. In some embodiments, the device 800 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 805 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 805 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 805 may comprise, or may be, a special-purpose processor/controller to operate according to the various embodiments herein. As examples, the processor(s) of application circuitry 805 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 800 may not utilize application circuitry 805, and instead may include a special-purpose processor/controller to process IP data received from an EPC or 5GC, for example.

In some implementations, the application circuitry 805 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 810 are discussed infra with regard to FIG. 10.

User interface circuitry 850 may include one or more user interfaces designed to enable user interaction with the system 800 or peripheral component interfaces designed to enable peripheral component interaction with the system 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 815 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1011 of FIG. 10 infra), and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 820 may be implemented as one or more of solder down packaged integrated circuits, socketed memory modules and plug-in memory cards.

The PMIC 825 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 830 may provide for electrical power drawn from a network cable to provide both power supply and data connectivity to the infrastructure equipment 800 using a single cable.

The network controller circuitry 835 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 800 via network interface connector 840 using a physical connection, which may be electrical (commonly referred to as a "copper interconnect"), optical, or wireless. The network controller circuitry 835 may include one or more dedicated processors and/or FPGAs to communicate using one or more of the aforementioned protocols. In some implementations, the network controller circuitry 835 may include multiple controllers to provide connectivity to other networks using the same or different protocols.

The positioning circuitry 845 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-Technology for Positioning, Navigation, and Timing (Micro-PNT) IC that uses a master timing clock to perform position tracking/estimation without GNSS assistance. The positioning circuitry 845 may also be part of, or interact with, the baseband circuitry 810 and/or RFEMs 815 to communicate with the nodes and components of the positioning network. The positioning circuitry 845 may also provide position data and/or time data to the application circuitry 805, which may use the data to synchronize operations with various infrastructure (e.g., RAN nodes 511, etc.), or the like.

The components shown by FIG. 8 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I²C interface, an SPI interface, point to point interfaces, and a power bus, among others.

Figure 9:
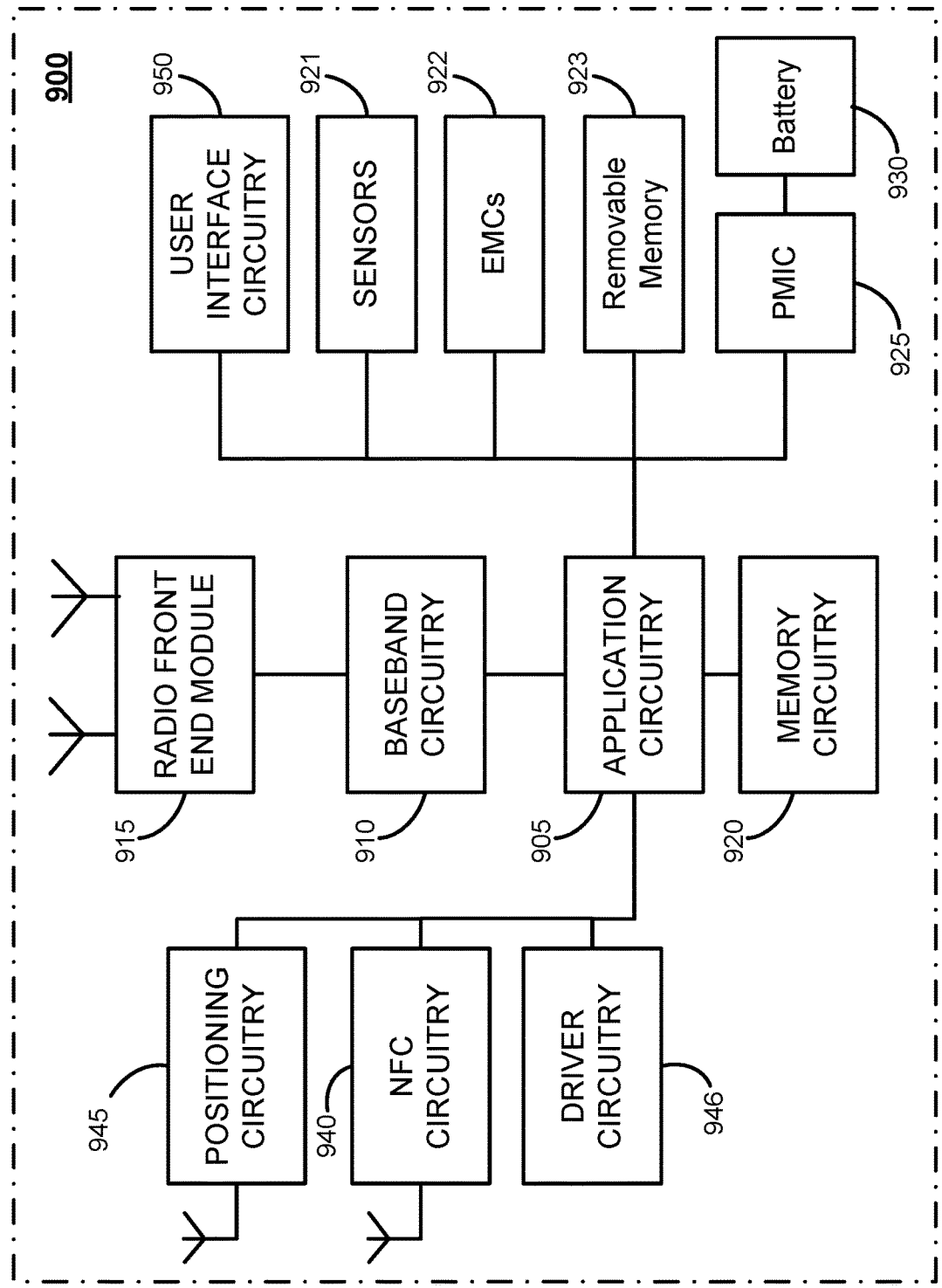
FIG. 9 depicts example components of a computer platform, in accordance with various embodiments.

FIG. 9 illustrates an example of a platform 900 (or "device 900") in accordance with various embodiments. In embodiments, the computer platform 900 may be suitable for use as UEs 501a, 501b, 601, application servers 530, and/or any other element/device discussed herein. The platform 900 may include any combinations of the components shown in the example. The components of platform 900 may be implemented as integrated circuits (ICs), portions thereof, discrete electronic devices, or other modules, logic, hardware, software, firmware, or a combination thereof adapted in the computer platform 900, or as components otherwise incorporated within a chassis of a larger system. The block diagram of FIG. 9 is intended to show a high level view of components of the computer platform 900. However, some of the components shown may be omitted, additional components may be present, and different arrangement of the components shown may occur in other implementations.

Application circuitry 905 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 905 may be coupled with or may include memory/storage elements and may be configured to execute instructions stored in the memory/storage to enable various applications or operating systems to run on the system 900. In some implementations, the memory/storage elements may be on-chip memory circuitry, which may include any suitable volatile and/or nonvolatile memory, such as DRAM, SRAM, EPROM, EEPROM, Flash memory, solid-state memory, and/or any other type of memory device technology, such as those discussed herein.

The processor(s) of application circuitry 805 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 805 may comprise, or may be, a special-purpose processor/controller to operate according to the various embodiments herein.

As examples, the processor(s) of application circuitry 905 may include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 905 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 905 may be a part of a system on a chip (SoC) in which the application circuitry 905 and other components are formed into a single integrated circuit, or a single package, such as the Edison™ or Galileo™ SoC boards from Intel® Corporation.

Additionally or alternatively, application circuitry 905 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 905 may comprise logic blocks or logic fabric, and other interconnected resources that may be programmed to perform various functions, such as the procedures, methods, functions, etc. of the various embodiments discussed herein. In such embodiments, the circuitry of application circuitry 905 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 910 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 910 are discussed infra with regard to FIG. 10.

The RFEMs 915 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1011 of FIG. 10 infra), and the RFEM may be connected to multiple antennas. In alternative implementations, both mmWave and sub-mmWave radio functions may be implemented in the same physical RFEM 915, which incorporates both mmWave antennas and sub-mmWave.

The memory circuitry 920 may include any number and type of memory devices used to provide for a given amount of system memory. As examples, the memory circuitry 920 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 920 may be developed in accordance with a Joint Electron Devices Engineering Council (JEDEC) low power double data rate (LPDDR)-based design, such as LPDDR2, LPDDR3, LPDDR4, or the like. Memory circuitry 920 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 920 may be on-die memory or registers associated with the application circuitry 905. To provide for persistent storage of information such as data, applications, operating systems and so forth, memory circuitry 920 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 900 may incorporate the three-dimensional (3D) cross-point (XPOINT) memories from Intel® and Micron®.

Removable memory circuitry 923 may include devices, circuitry, enclosures/housings, ports or receptacles, etc. used to couple portable data storage devices with the platform 900. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 900 may also include interface circuitry (not shown) that is used to connect external devices with the platform 900. The external devices connected to the platform 900 via the interface circuitry include sensor circuitry 921 and electro-mechanical components (EMCs) 922, as well as removable memory devices coupled to removable memory circuitry 923.

The sensor circuitry 921 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 922 include devices, modules, or subsystems whose purpose is to enable platform 900 to change its state, position, and/or orientation, or move or control a mechanism or (sub)system. Additionally, EMCs 922 may be configured to generate and send messages/signalling to other components of the platform 900 to indicate a current state of the EMCs 922. Examples of the EMCs 922 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 900 is configured to operate one or more EMCs 922 based on one or more captured events and/or instructions or control signals received from a service provider and/or various clients.

In some implementations, the interface circuitry may connect the platform 900 with positioning circuitry 945. The positioning circuitry 945 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 945 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 945 may include a Micro-PNT IC that uses a master timing clock to perform position tracking/estimation without GNSS assistance. The positioning circuitry 945 may also be part of, or interact with, the baseband circuitry 810 and/or RFEMs 915 to communicate with the nodes and components of the positioning network. The positioning circuitry 945 may also provide position data and/or time data to the application circuitry 905, which may use the data to synchronize operations with various infrastructure (e.g., radio base stations), for turn-by-turn navigation applications, or the like In some implementations, the interface circuitry may connect the platform 900 with Near-Field Communication (NFC) circuitry 940. NFC circuitry 940 is configured to provide contactless, short-range communications based on radio frequency identification (RFID) standards, wherein magnetic field induction is used to enable communication between NFC circuitry 940 and NFC-enabled devices external to the platform 900 (e.g., an "NFC touchpoint"). NFC circuitry 940 comprises an NFC controller coupled with an antenna element and a processor coupled with the NFC controller. The NFC controller may be a chip/IC providing NFC functionalities to the NFC circuitry 940 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 940, or initiate data transfer between the NFC circuitry 940 and another active NFC device (e.g., a smartphone or an NFC-enabled POS terminal) that is proximate to the platform 900.

The driver circuitry 946 may include software and hardware elements that operate to control particular devices that are embedded in the platform 900, attached to the platform 900, or otherwise communicatively coupled with the platform 900. The driver circuitry 946 may include individual drivers allowing other components of the platform 900 to interact with or control various input/output (I/O) devices that may be present within, or connected to, the platform 900. For example, driver circuitry 946 may include a display driver to control and allow access to a display device, a touchscreen driver to control and allow access to a touchscreen interface of the platform 900, sensor drivers to obtain sensor readings of sensor circuitry 921 and control and allow access to sensor circuitry 921, EMC drivers to obtain actuator positions of the EMCs 922 and/or control and allow access to the EMCs 922, a camera driver to control and allow access to an embedded image capture device, audio drivers to control and allow access to one or more audio devices.

The power management integrated circuitry (PMIC) 925 (also referred to as "power management circuitry 925") may manage power provided to various components of the platform 900. In particular, with respect to the baseband circuitry 910, the PMIC 925 may control power-source selection, voltage scaling, battery charging, or DC-to-DC conversion. The PMIC 925 may often be included when the platform 900 is capable of being powered by a battery 930, for example, when the device is included in a UE 501*a*, 501*b*, 601.

In some embodiments, the PMIC 925 may control, or otherwise be part of, various power saving mechanisms of the platform 900. For example, if the platform 900 is in an RRC_Connected state, where it is still connected to the RAN node as it expects to receive traffic shortly, then it may enter a state known as Discontinuous Reception Mode (DRX) after a period of inactivity. During this state, the platform 900 may power down for brief intervals of time and thus save power. If there is no data traffic activity for an extended period of time, then the platform 900 may transition off to an RRC Idle state, where it disconnects from the network and does not perform operations such as channel quality feedback, handover, etc. The platform 900 goes into a very low power state and it performs paging where again it periodically wakes up to listen to the network and then powers down again. The platform 900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 930 may power the platform 900, although in some examples the platform 900 may be mounted deployed in a fixed location, and may have a power supply coupled to an electrical grid. The battery 930 may be a lithium ion battery, a metal-air battery, such as a zinc-air battery, an aluminum-air battery, a lithium-air battery, and the like. In some implementations, such as in V2X applications, the battery 930 may be a typical lead-acid automotive battery.

In some implementations, the battery 930 may be a "smart battery," which includes or is coupled with a Battery Management System (BMS) or battery monitoring integrated circuitry. The BMS may be included in the platform 900 to track the state of charge (SoCh) of the battery 930. The BMS may be used to monitor other parameters of the battery 930 to provide failure predictions, such as the state of health (SoH) and the state of function (SoF) of the battery 930. The BMS may communicate the information of the battery 930 to the application circuitry 905 or other components of the platform 900. The BMS may also include an analog-to-digital (ADC) convertor that allows the application circuitry 905 to directly monitor the voltage of the battery 930 or the current flow from the battery 930. The battery parameters may be used to determine actions that the platform 900 may perform, such as transmission frequency, network operation, sensing frequency, and the like.

A power block, or other power supply coupled to an electrical grid may be coupled with the BMS to charge the battery 930. In some examples, the power block 930 may be replaced with a wireless power receiver to obtain the power wirelessly, for example, through a loop antenna in the computer platform 900. In these examples, a wireless battery charging circuit may be included in the BMS. The specific charging circuits chosen may depend on the size of the battery 930, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 950 includes various input/output (I/O) devices present within, or connected to, the platform 900, and includes one or more user interfaces designed to enable user interaction with the platform 900 and/or peripheral component interfaces designed to enable peripheral component interaction with the platform 900. The user interface circuitry 950 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 900. The output device circuitry may also include speakers or other audio emitting devices, printer(s), and/or the like. In some embodiments, the sensor circuitry 921 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 900 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I$^2$C interface, an SPI interface, point-to-point interfaces, and a power bus, among others.

Figure 10:
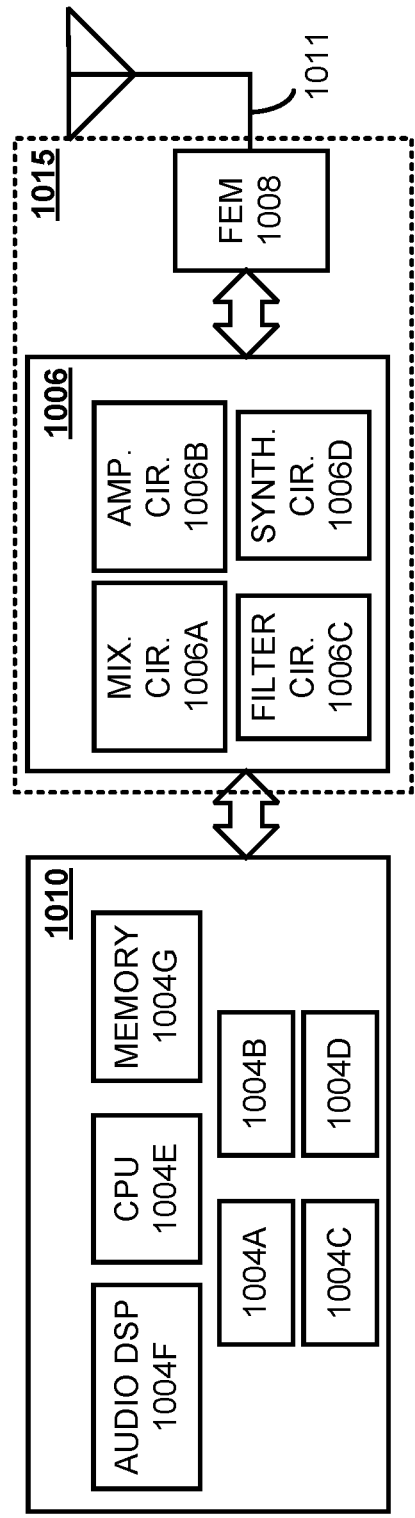
FIG. 10 depicts example components of baseband circuitry and radio frequency circuitry, in accordance with various embodiments.

FIG. 10 illustrates example components of baseband circuitry 1010 and radio front end modules (RFEM) 1015 in accordance with various embodiments. The baseband circuitry 1010 corresponds to the baseband circuitry 810 and 910 of FIGS. 8 and 9, respectively. The RFEM 1015 corresponds to the RFEM 815 and 915 of FIGS. 8 and 9, respectively. As shown, the RFEMs 1015 may include Radio Frequency (RF) circuitry 1006, front-end module (FEM) circuitry 1008, antenna array 1011 coupled together at least as shown.

The baseband circuitry 1010 includes circuitry and/or control logic configured to carry out various radio/network protocol and radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1010 may include Fast-Fourier Transform (FFT), precoding, or constellation mapping/demapping functionality. In some embodiments, encoding/decoding circuitry of the baseband circuitry 1010 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1010 is configured to process baseband signals received from a receive signal path of the RF circuitry 1006 and to generate baseband signals for a transmit signal path of the RF circuitry 1006. The baseband circuitry 1010 is configured to interface with application circuitry 805/905 (see FIGS. 8 and 9) for generation and processing of the baseband signals and for controlling operations of the RF circuitry 1006. The baseband circuitry 1010 may handle various radio control functions.

The aforementioned circuitry and/or control logic of the baseband circuitry 1010 may include one or more single or multi-core processors. For example, the one or more processors may include a 3G baseband processor 1004A, a 4G/LTE baseband processor 1004B, a 5G/NR baseband processor 1004C, or some other baseband processor(s) 1004D for other existing generations, generations in development or to be developed in the future (e.g., sixth generation (6G), etc.). In other embodiments, some or all of the functionality of baseband processors 1004A-D may be included in modules stored in the memory 1004G and executed via a Central Processing Unit (CPU) 1004E. In other embodiments, some or all of the functionality of baseband processors 1004A-D may be provided as hardware accelerators (e.g., FPGAs, ASICs, etc.) loaded with the appropriate bit streams or logic blocks stored in respective memory cells. In various embodiments, the memory 1004G may store program code of a real-time OS (RTOS), which when executed by the CPU 1004E (or other baseband processor), is to cause the CPU 1004E (or other baseband processor) to manage resources of the baseband circuitry 1010, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1010 includes one or more audio digital signal processor(s) (DSP) 1004F. The audio DSP(s) 1004F include elements for compression/decompression and echo cancellation and may include other suitable processing elements in other embodiments.

In some embodiments, each of the processors 1004A-1004E include respective memory interfaces to send/receive data to/from the memory 1004G. The baseband circuitry 1010 may further include one or more interfaces to communicatively couple to other circuitries/devices, such as an interface to send/receive data to/from memory external to the baseband circuitry 1010; an application circuitry interface to send/receive data to/from the application circuitry 805/905 of FIGS. 8-10); an RF circuitry interface to send/receive data to/from RF circuitry 1006 of FIG. 10; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 925.

In alternate embodiments (which may be combined with the above described embodiments), baseband circuitry 1010 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1010 may include protocol processing circuitry with one or more instances of control circuitry (not shown) to provide control functions for the digital baseband circuitry and/or radio frequency circuitry (e.g., the radio front end modules 1015).

Although not shown by FIG. 10, in some embodiments, the baseband circuitry 1010 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1010 and/or RF circuitry 1006 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1010 and/or RF circuitry 1006 are part of a Wi-Fi communication system. In the second example, the protocol processing circuitry would operate Wi-Fi MAC and logical link control (LLC) functions. The protocol processing circuitry may include one or more memory structures (e.g., 1004G) to store program code and data for operating the protocol functions, as well as one or more processing cores to execute the program code and perform various operations using the data. The baseband circuitry 1010 may also support radio communications for more than one wireless protocol.

The various hardware elements of the baseband circuitry 1010 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1010 may be suitably combined in a single chip or chipset, or disposed on a same circuit board. In another example, some or all of the constituent components of the baseband circuitry 1010 and RF circuitry 1006 may be implemented together such as, for example, a system on a chip (SoC) or System-in-Package (SiP). In another example, some or all of the constituent components of the baseband circuitry 1010 may be implemented as a separate SoC that is communicatively coupled with and RF circuitry 1006 (or multiple instances of RF circuitry 1006). In yet another example, some or all of the constituent components of the baseband circuitry 1010 and the application circuitry 805/905 may be implemented together as individual SoCs mounted to a same circuit board (e.g., a "multi-chip package").

In some embodiments, the baseband circuitry 1010 may provide for communication compatible with one or more radio technologies. For example, in some embodiments, the baseband circuitry 1010 may support communication with an E-UTRAN or other WMAN, a WLAN, a WPAN. Embodiments in which the baseband circuitry 1010 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path, which may include circuitry to down-convert RF signals received from the FEM circuitry 1008 and provide baseband signals to the baseband circuitry 1010. RF circuitry 1006 may also include a transmit signal path, which may include circuitry to up-convert baseband signals provided by the baseband circuitry 1010 and provide RF output signals to the FEM circuitry 1008 for transmission.

In some embodiments, the receive signal path of the RF circuitry 1006 may include mixer circuitry 1006a, amplifier circuitry 1006*b* and filter circuitry 1006*c*. In some embodiments, the transmit signal path of the RF circuitry 1006 may include filter circuitry 1006*c* and mixer circuitry 1006*a*. RF circuitry 1006 may also include synthesizer circuitry 1006*d* for synthesizing a frequency for use by the mixer circuitry 1006*a* of the receive signal path and the transmit signal path. In some embodiments, the mixer circuitry 1006*a* of the receive signal path may be configured to down-convert RF signals received from the FEM circuitry 1008 based on the synthesized frequency provided by synthesizer circuitry 1006*d*. The amplifier circuitry 1006*b* may be configured to amplify the down-converted signals and the filter circuitry 1006*c* may be a low-pass filter (LPF) or band-pass filter (BPF) configured to remove unwanted signals from the down-converted signals to generate output baseband signals. Output baseband signals may be provided to the baseband circuitry 1010 for further processing. In some embodiments, the output baseband signals may be zero-frequency baseband signals, although this is not a requirement. In some embodiments, mixer circuitry 1006*a* of the receive signal path may comprise passive mixers, although the scope of the embodiments is not limited in this respect.

In some embodiments, the mixer circuitry 1006*a* of the transmit signal path may be configured to up-convert input baseband signals based on the synthesized frequency provided by the synthesizer circuitry 1006*d* to generate RF output signals for the FEM circuitry 1008. The baseband signals may be provided by the baseband circuitry 1010 and may be filtered by filter circuitry 1006*c*.

In some embodiments, the mixer circuitry 1006*a* of the receive signal path and the mixer circuitry 1006*a* of the transmit signal path may include two or more mixers and may be arranged for quadrature downconversion and upconversion, respectively. In some embodiments, the mixer circuitry 1006*a* of the receive signal path and the mixer circuitry 1006*a* of the transmit signal path may include two or more mixers and may be arranged for image rejection (e.g., Hartley image rejection). In some embodiments, the mixer circuitry 1006*a* of the receive signal path and the mixer circuitry 1006*a* of the transmit signal path may be arranged for direct downconversion and direct upconversion, respectively. In some embodiments, the mixer circuitry 1006*a* of the receive signal path and the mixer circuitry 1006*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1010 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006*d* may be a fractional-N synthesizer or a fractional N/N+1 synthesizer, although the scope of the embodiments is not limited in this respect as other types of frequency synthesizers may be suitable. For example, synthesizer circuitry 1006*d* may be a delta-sigma synthesizer, a frequency multiplier, or a synthesizer comprising a phase-locked loop with a frequency divider.

The synthesizer circuitry 1006*d* may be configured to synthesize an output frequency for use by the mixer circuitry 1006*a* of the RF circuitry 1006 based on a frequency input and a divider control input. In some embodiments, the synthesizer circuitry 1006*d* may be a fractional N/N+1 synthesizer.

In some embodiments, frequency input may be provided by a voltage controlled oscillator (VCO), although that is not a requirement. Divider control input may be provided by either the baseband circuitry 1010 or the application circuitry 805/905 depending on the desired output frequency. In some embodiments, a divider control input (e.g., N) may be determined from a look-up table based on a channel indicated by the application circuitry 805/905.

Synthesizer circuitry 1006*d* of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path, which may include circuitry configured to operate on RF signals received from antenna array 1011, amplify the received signals and provide the amplified versions of the received signals to the RF circuitry 1006 for further processing. FEM circuitry 1008 may also include a transmit signal path, which may include circuitry configured to amplify signals for transmission provided by the RF circuitry 1006 for transmission by one or more of antenna elements of antenna array 1011. In various embodiments, the amplification through the transmit or receive signal paths may be done solely in the RF circuitry 1006, solely in the FEM circuitry 1008, or in both the RF circuitry 1006 and the FEM circuitry 1008.

In some embodiments, the FEM circuitry 1008 may include a TX/RX switch to switch between transmit mode and receive mode operation. The FEM circuitry 1008 may include a receive signal path and a transmit signal path. The receive signal path of the FEM circuitry 1008 may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission by one or more antenna elements of the antenna array 1011.

The antenna array 1011 comprises one or more antenna elements, each of which is configured convert electrical signals into radio waves to travel through the air and to convert received radio waves into electrical signals. For example, digital baseband signals provided by the baseband circuitry 1010 is converted into analog RF signals (e.g., modulated waveform) that will be amplified and transmitted via the antenna elements of the antenna array 1011 including one or more antenna elements (not shown). The antenna elements may be omnidirectional, direction, or a combination thereof. The antenna elements may be formed in a multitude of arranges as are known and/or discussed herein. The antenna array 1011 may comprise microstrip antennas or printed antennas that are fabricated on the surface of one or more printed circuit boards. The antenna array 1011 may be formed in as a patch of metal foil (e.g., a patch antenna) in a variety of shapes, and may be coupled with the RF circuitry 1006 and/or FEM circuitry 1008 using metal transmission lines or the like.

Processors of the application circuitry 805/905 and processors of the baseband circuitry 1010 may be used to execute elements of one or more instances of a protocol stack. For example, processors of the baseband circuitry 1010, alone or in combination, may be used execute Layer 3, Layer 2, or Layer 1 functionality, while processors of the application circuitry 805/905 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 11:
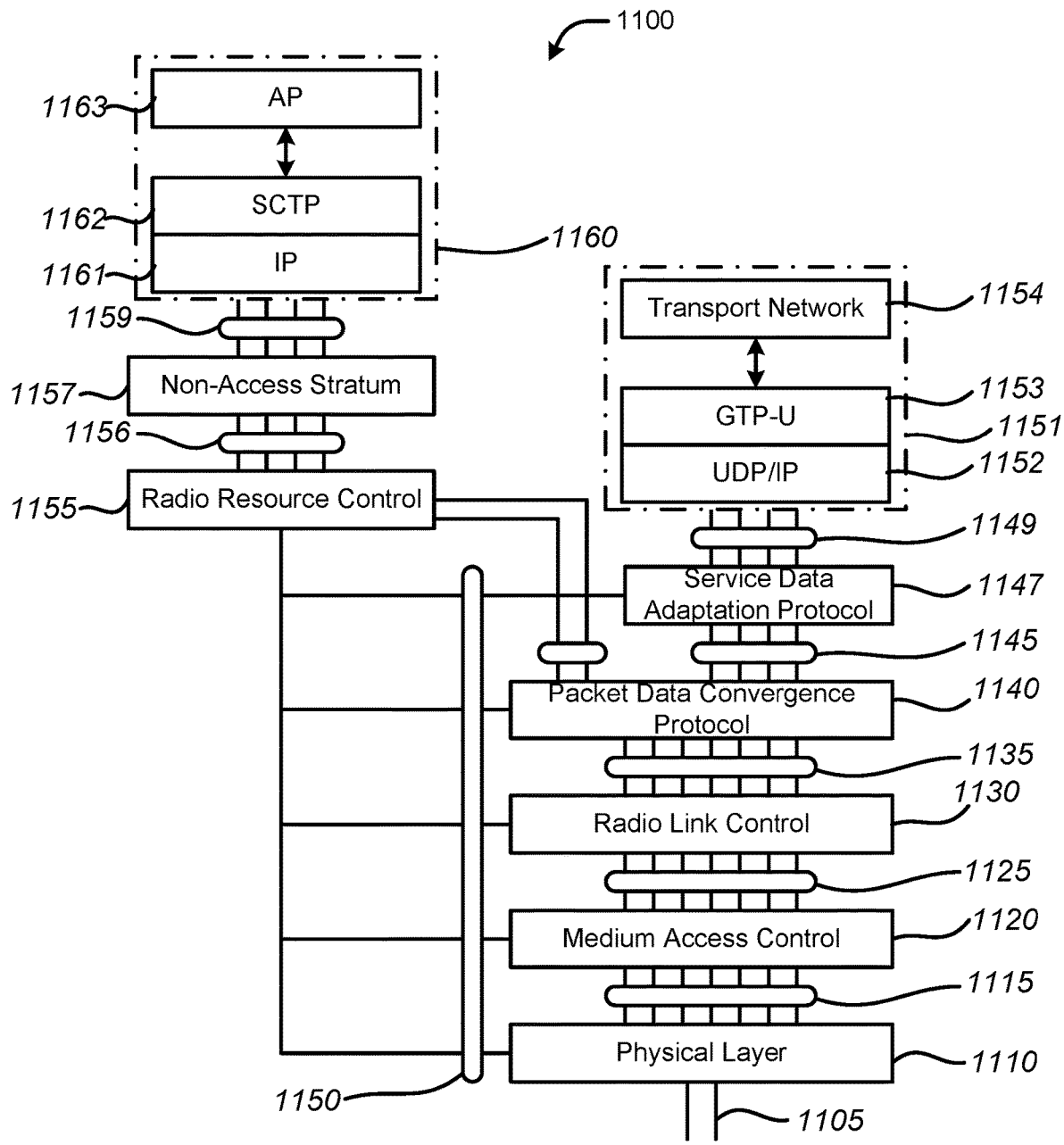
FIG. 11 is an illustration of various protocol functions that may be used for various protocol stacks, in accordance with various embodiments.

FIG. 11 illustrates various protocol functions that may be implemented in a wireless communication device according to various embodiments. In particular, FIG. 11 includes an arrangement 1100 showing interconnections between various protocol layers/entities. The following description of FIG. 11 is provided for various protocol layers/entities that operate in conjunction with the 5G/NR system standards and LTE system standards, but some or all of the aspects of FIG. 11 may be applicable to other wireless communication network systems as well.

The protocol layers of arrangement 1100 may include one or more of PHY 1110, MAC 1120, RLC 1130, PDCP 1140, SDAP 1147, RRC 1155, and NAS layer 1157, in addition to other higher layer functions not illustrated. The protocol layers may include one or more service access points (e.g., items 1159, 1156, 1150, 1149, 1145, 1135, 1125, and 1115 in FIG. 11) that may provide communication between two or more protocol layers.

The PHY 1110 may transmit and receive physical layer signals 1105 that may be received from or transmitted to one or more other communication devices. The physical layer signals 1105 may comprise one or more physical channels, such as those discussed herein. The PHY 1110 may further perform link adaptation or adaptive modulation and coding (AMC), power control, cell search (e.g., for initial synchronization and handover purposes), and other measurements used by higher layers, such as the RRC 1155. The PHY 1110 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1110 may process requests from and provide indications to an instance of MAC 1120 via one or more PHY-SAP 1115. According to some embodiments, requests and indications communicated via PHY-SAP 1115 may comprise one or more transport channels.

Instance(s) of MAC 1120 may process requests from, and provide indications to, an instance of RLC 1130 via one or more MAC-SAPs 1125. These requests and indications communicated via the MAC-SAP 1125 may comprise one or more logical channels. The MAC 1120 may perform mapping between the logical channels and transport channels, multiplexing of MAC SDUs from one or more logical channels onto TBs to be delivered to PHY 1110 via the transport channels, de-multiplexing MAC SDUs to one or more logical channels from TBs delivered from the PHY 1110 via transport channels, multiplexing MAC SDUs onto TBs, scheduling information reporting, error correction through HARQ, and logical channel prioritization.

Instance(s) of RLC 1130 may process requests from and provide indications to an instance of PDCP 1140 via one or more radio link control service access points (RLC-SAP) 1135. These requests and indications communicated via RLC-SAP 1135 may comprise one or more RLC channels. The RLC 1130 may operate in a plurality of modes of operation, including: Transparent Mode™, Unacknowledged Mode (UM), and Acknowledged Mode (AM). The RLC 1130 may execute transfer of upper layer protocol data units (PDUs), error correction through automatic repeat request (ARQ) for AM data transfers, and concatenation, segmentation and reassembly of RLC SDUs for UM and AM data transfers. The RLC 1130 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1140 may process requests from and provide indications to instance(s) of RRC 1155 and/or instance(s) of SDAP 1147 via one or more packet data convergence protocol service access points (PDCP-SAP) 1145. These requests and indications communicated via PDCP-SAP 1145 may comprise one or more radio bearers. The PDCP 1140 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1147 may process requests from and provide indications to one or more higher layer protocol entities via one or more SDAP-SAP 1149. These requests and indications communicated via SDAP-SAP 1149 may comprise one or more QoS flows. The SDAP 1147 may map QoS flows to DRBs, and vice versa, and may also mark QFIs in DL and UL packets. A single SDAP entity 1147 may be configured for an individual PDU session. In the UL direction, the NG-RAN 510 may control the mapping of QoS Flows to DRB(s) in two different ways, reflective mapping or explicit mapping. For reflective mapping, the SDAP 1147 of a UE 501 may monitor the QFIs of the DL packets for each DRB, and may apply the same mapping for packets flowing in the UL direction. For a DRB, the SDAP 1147 of the UE 501 may map the UL packets belonging to the QoS flows(s) corresponding to the QoS flow ID(s) and PDU session observed in the DL packets for that DRB. To enable reflective mapping, the NG-RAN 710 may mark DL packets over the Uu interface with a QoS flow ID. The explicit mapping may involve the RRC 1155 configuring the SDAP 1147 with an explicit QoS flow to DRB mapping rule, which may be stored and followed by the SDAP 1147. In embodiments, the SDAP 1147 may only be used in NR implementations and may not be used in LTE implementations.

The RRC 1155 may configure, via one or more management service access points (M-SAP), aspects of one or more protocol layers, which may include one or more instances of PHY 1110, MAC 1120, RLC 1130, PDCP 1140 and SDAP 1147. In embodiments, an instance of RRC 1155 may process requests from and provide indications to one or more NAS entities 1157 via one or more RRC-SAPs 1156. The main services and functions of the RRC 1155 may include broadcast of system information (e.g., included in MIBs or SIBs related to the NAS), broadcast of system information related to the access stratum (AS), paging, establishment, maintenance and release of an RRC connection between the UE 501 and RAN 510 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1157 may form the highest stratum of the control plane between the UE 501 and the AMF 721. The NAS 1157 may support the mobility of the UEs 501 and the session management procedures to establish and maintain IP connectivity between the UE 501 and a P-GW in LTE systems.

According to various embodiments, one or more protocol entities of arrangement 1100 may be implemented in UEs 501, RAN nodes 511, AMF 721 in NR implementations or MME 621 in LTE implementations, UPF 702 in NR implementations or S-GW 622 and P-GW 623 in LTE implementations, or the like to be used for control plane or user plane communications protocol stack between the aforementioned devices. In such embodiments, one or more protocol entities that may be implemented in one or more of UE 501, gNB 511, AMF 721, etc. may communicate with a respective peer protocol entity that may be implemented in or on another device using the services of respective lower layer protocol entities to perform such communication. In some embodiments, a gNB-CU of the gNB 511 may host the RRC 1155, SDAP 1147, and PDCP 1140 of the gNB that controls the operation of one or more gNB-DUs, and the gNB-DUs of the gNB 511 may each host the RLC 1130, MAC 1120, and PHY 1110 of the gNB 511.

In a first example, a control plane protocol stack may comprise, in order from highest layer to lowest layer, NAS 1157, RRC 1155, PDCP 1140, RLC 1130, MAC 1120, and PHY 1110. In this example, upper layers 1160 may be built on top of the NAS 1157, which includes an IP layer 1161, an SCTP 1162, and an application layer signaling protocol (AP) 1163.

In NR implementations, the AP 1163 may be an NG application protocol layer (NGAP or NG-AP) 1163 for the NG interface 513 defined between the NG-RAN node 511 and the AMF 721, or the AP 1163 may be an Xn application protocol layer (XnAP or Xn-AP) 1163 for the Xn interface 512 that is defined between two or more RAN nodes 511.

The NG-AP 1163 may support the functions of the NG interface 513 and may comprise Elementary Procedures (EPs). An NG-AP EP may be a unit of interaction between the NG-RAN node 511 and the AMF 721. The NG-AP 1163 services may comprise two groups: UE-associated services (e.g., services related to a UE 501a, 501b) and non-UE-associated services (e.g., services related to the whole NG interface instance between the NG-RAN node 511 and AMF 721). These services may include functions including, but not limited to: a paging function for the sending of paging requests to NG-RAN nodes 511 involved in a particular paging area; a UE context management function for allowing the AMF 721 to establish, modify, and/or release a UE context in the AMF 721 and the NG-RAN node 511; a mobility function for UEs 501 in ECM-CONNECTED mode for intra-system HOs to support mobility within NG-RAN and inter-system HOs to support mobility from/to EPS systems; a NAS Signaling Transport function for transporting or rerouting NAS messages between UE 501 and AMF 721; a NAS node selection function for determining an association between the AMF 721 and the UE 501; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 511 via CN 520; and/or other like functions.

The XnAP 1163 may support the functions of the Xn interface 512 and may comprise XnAP basic mobility procedures and XnAP global procedures. The XnAP basic mobility procedures may comprise procedures used to handle UE mobility within the NG RAN 511 (or E-UTRAN 610), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 501, such as Xn interface setup and reset procedures, NG-RAN update procedures, cell activation procedures, and the like.

In LTE implementations, the AP 1163 may be an S1 Application Protocol layer (S1-AP) 1163 for the S1 interface 513 defined between an E-UTRAN node 511 and an MME, or the AP 1163 may be an X2 application protocol layer (X2AP or X2-AP) 1163 for the X2 interface 512 that is defined between two or more E-UTRAN nodes 511.

The S1 Application Protocol layer (S1-AP) 1163 may support the functions of the S1 interface, and similar to the NG-AP discussed previously, the S1-AP may comprise S1-AP EPs. An S1-AP EP may be a unit of interaction between the E-UTRAN node 511 and an MME 621 within an LTE CN 520. The S1-AP 1163 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1163 may support the functions of the X2 interface 512 and may comprise X2AP basic mobility procedures and X2AP global procedures. The X2AP basic mobility procedures may comprise procedures used to handle UE mobility within the E-UTRAN 520, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 501, such as X2 interface setup and reset procedures, load indication procedures, error indication procedures, cell activation procedures, and the like.

The SCTP layer (alternatively referred to as the SCTP/IP layer) 1162 may provide guaranteed delivery of application layer messages (e.g., NGAP or XnAP messages in NR implementations, or S1-AP or X2AP messages in LTE implementations). The SCTP 1162 may ensure reliable delivery of signaling messages between the RAN node 511 and the AMF 721/MME 621 based, in part, on the IP protocol, supported by the IP 1161. The Internet Protocol layer (IP) 1161 may be used to perform packet addressing and routing functionality. In some implementations the IP layer 1161 may use point-to-point transmission to deliver and convey PDUs. In this regard, the RAN node 511 may comprise L2 and L1 layer communication links (e.g., wired or wireless) with the MME/AMF to exchange information.

In a second example, a user plane protocol stack may comprise, in order from highest layer to lowest layer, SDAP 1147, PDCP 1140, RLC 1130, MAC 1120, and PHY 1110. The user plane protocol stack may be used for communication between the UE 501, the RAN node 511, and UPF 702 in NR implementations or an S-GW 622 and P-GW 623 in LTE implementations. In this example, upper layers 1151 may be built on top of the SDAP 1147, and may include a user datagram protocol (UDP) and IP security layer (UDP/IP) 1152, a General Packet Radio Service (GPRS) Tunneling Protocol for the user plane layer (GTP-U) 1153, and a User Plane PDU layer (UP PDU) 1163.

The transport network layer 1154 (also referred to as a "transport layer") may be built on IP transport, and the GTP-U 1153 may be used on top of the UDP/IP layer 1152 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1153 may be used for carrying user data within the GPRS core network and between the radio access network and the core network. The user data transported can be packets in any of IPv4, IPv6, or PPP formats, for example. The UDP/IP 1152 may provide checksums for data integrity, port numbers for addressing different functions at the source and destination, and encryption and authentication on the selected data flows. The RAN node 511 and the S-GW 622 may utilize an S1-U interface to exchange user plane data via a protocol stack comprising an L1 layer (e.g., PHY 1110), an L2 layer (e.g., MAC 1120, RLC 1130, PDCP 1140, and/or SDAP 1147), the UDP/IP layer 1152, and the GTP-U 1153. The S-GW 622 and the P-GW 623 may utilize an S5/S8a interface to exchange user plane data via a protocol stack comprising an L1 layer, an L2 layer, the UDP/IP layer 1152, and the GTP-U 1153. As discussed previously, NAS protocols may support the mobility of the UE 501 and the session management procedures to establish and maintain IP connectivity between the UE 501 and the P-GW 623.

Moreover, although not shown by FIG. 11, an application layer may be present above the AP 1163 and/or the transport network layer 1154. The application layer may be a layer in which a user of the UE 501, RAN node 511, or other network element interacts with software applications being executed, for example, by application circuitry 805 or application circuitry 905, respectively. The application layer may also provide one or more interfaces for software applications to interact with communications systems of the UE 501 or RAN node 511, such as the baseband circuitry 1010. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 12:
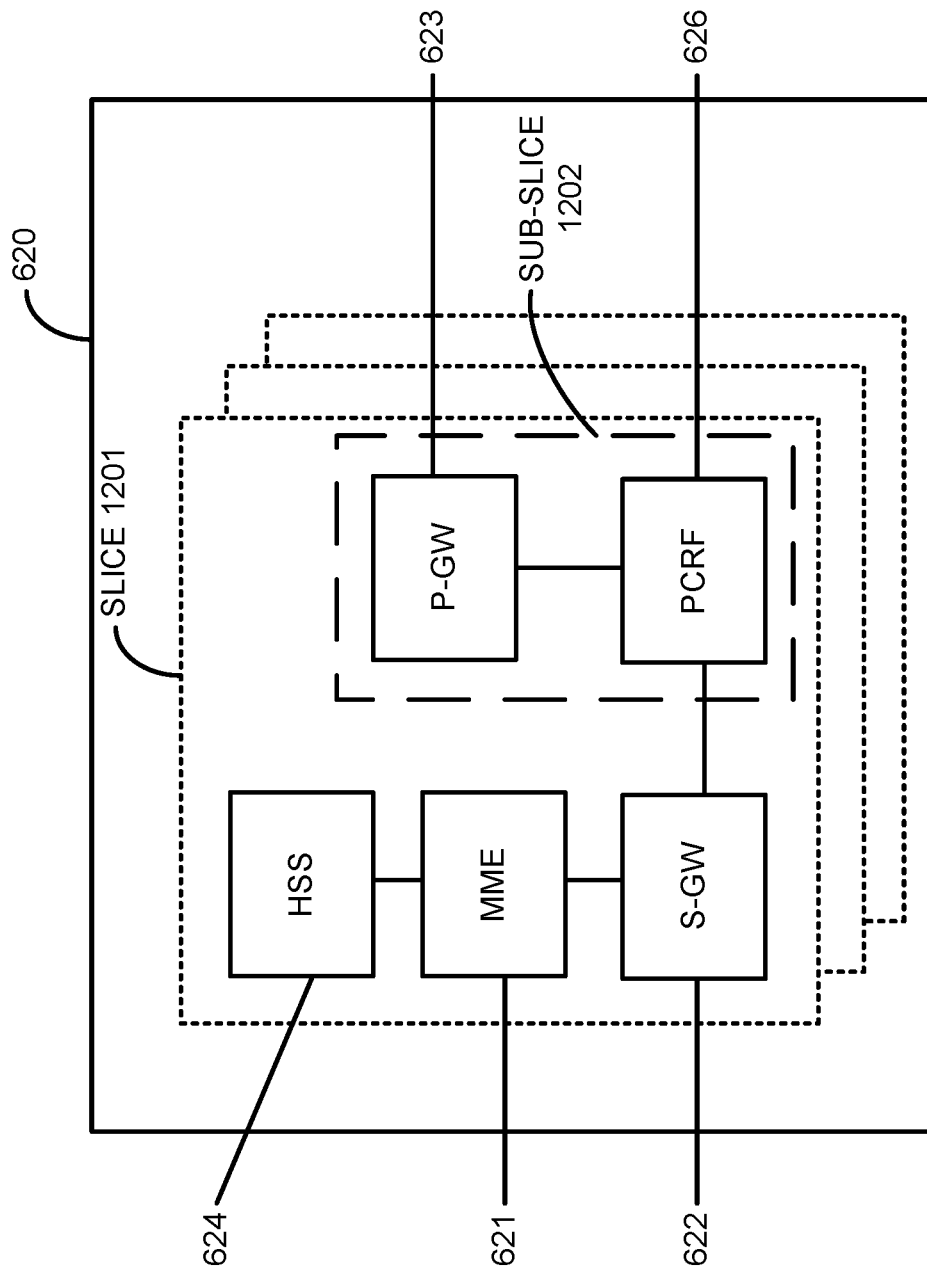
FIG. 12 illustrates components of a core network, in accordance with various embodiments.

FIG. 12 illustrates components of a core network in accordance with various embodiments. The components of the CN 620 may be implemented in one physical node or separate physical nodes including components to read and execute instructions from a machine-readable or computer-readable medium (e.g., a non-transitory machine-readable storage medium). In embodiments, the components of CN 720 may be implemented in a same or similar manner as discussed herein with regard to the components of CN 620. In some embodiments, NFV is utilized to virtualize any or all of the above-described network node functions via executable instructions stored in one or more computer-readable storage mediums (described in further detail below). A logical instantiation of the CN 620 may be referred to as a network slice 1201, and individual logical instantiations of the CN 620 may provide specific network capabilities and network characteristics. A logical instantiation of a portion of the CN 620 may be referred to as a network sub-slice 1202 (e.g., the network sub-slice 1202 is shown to include the P-GW 623 and the PCRF 626).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 7), a network slice always comprises a RAN part and a CN part. The support of network slicing relies on the principle that traffic for different slices is handled by different PDU sessions. The network can realize the different network slices by scheduling and also by providing different L1/L2 configurations. The UE 701 provides assistance information for network slice selection in an appropriate RRC message, if it has been provided by NAS. While the network can support large number of slices, the UE need not support more than 8 slices simultaneously.

A network slice may include the CN 720 control plane and user plane NFs, NG-RANs 710 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 701 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 721 instance serving an individual UE 701 may belong to each of the network slice instances serving that UE.

Network Slicing in the NG-RAN 710 involves RAN slice awareness. RAN slice awareness includes differentiated handling of traffic for different network slices, which have been pre-configured. Slice awareness in the NG-RAN 710 is introduced at the PDU session level by indicating the S-NSSAI corresponding to a PDU session in all signaling that includes PDU session resource information. How the NG-RAN 710 supports the slice enabling in terms of NG-RAN functions (e.g., the set of network functions that comprise each slice) is implementation dependent. The NG-RAN 710 selects the RAN part of the network slice using assistance information provided by the UE 701 or the 5GC 720, which unambiguously identifies one or more of the pre-configured network slices in the PLMN. The NG-RAN 710 also supports resource management and policy enforcement between slices as per SLAs. A single NG-RAN node may support multiple slices, and the NG-RAN 710 may also apply an appropriate RRM policy for the SLA in place to each supported slice. The NG-RAN 710 may also support QoS differentiation within a slice.

The NG-RAN 710 may also use the UE assistance information for the selection of an AMF 721 during an initial attach, if available. The NG-RAN 710 uses the assistance information for routing the initial NAS to an AMF 721. If the NG-RAN 710 is unable to select an AMF 721 using the assistance information, or the UE 701 does not provide any such information, the NG-RAN 710 sends the NAS signaling to a default AMF 721, which may be among a pool of AMFs 721. For subsequent accesses, the UE 701 provides a temp ID, which is assigned to the UE 701 by the 5GC 720, to enable the NG-RAN 710 to route the NAS message to the appropriate AMF 721 as long as the temp ID is valid. The NG-RAN 710 is aware of, and can reach, the AMF 721 that is associated with the temp ID. Otherwise, the method for initial attach applies.

The NG-RAN 710 supports resource isolation between slices. NG-RAN 710 resource isolation may be achieved by means of RRM policies and protection mechanisms that should avoid that shortage of shared resources if one slice breaks the service level agreement for another slice. In some implementations, it is possible to fully dedicate NG-RAN 710 resources to a certain slice. How NG-RAN 710 supports resource isolation is implementation dependent.

Some slices may be available only in part of the network. Awareness in the NG-RAN 710 of the slices supported in the cells of its neighbors may be beneficial for inter-frequency mobility in connected mode. The slice availability may not change within the UE's registration area. The NG-RAN 710 and the 5GC 720 are responsible to handle a service request for a slice that may or may not be available in a given area. Admission or rejection of access to a slice may depend on factors such as support for the slice, availability of resources, support of the requested service by NG-RAN 710.

The UE 701 may be associated with multiple network slices simultaneously. In case the UE 701 is associated with multiple slices simultaneously, only one signaling connection is maintained, and for intra-frequency cell reselection, the UE 701 tries to camp on the best cell. For inter-frequency cell reselection, dedicated priorities can be used to control the frequency on which the UE 701 camps. The 5GC 720 is to validate that the UE 701 has the rights to access a network slice. Prior to receiving an Initial Context Setup Request message, the NG-RAN 710 may be allowed to apply some provisional/local policies, based on awareness of a particular slice that the UE 701 is requesting to access. During the initial context setup, the NG-RAN 710 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 13:
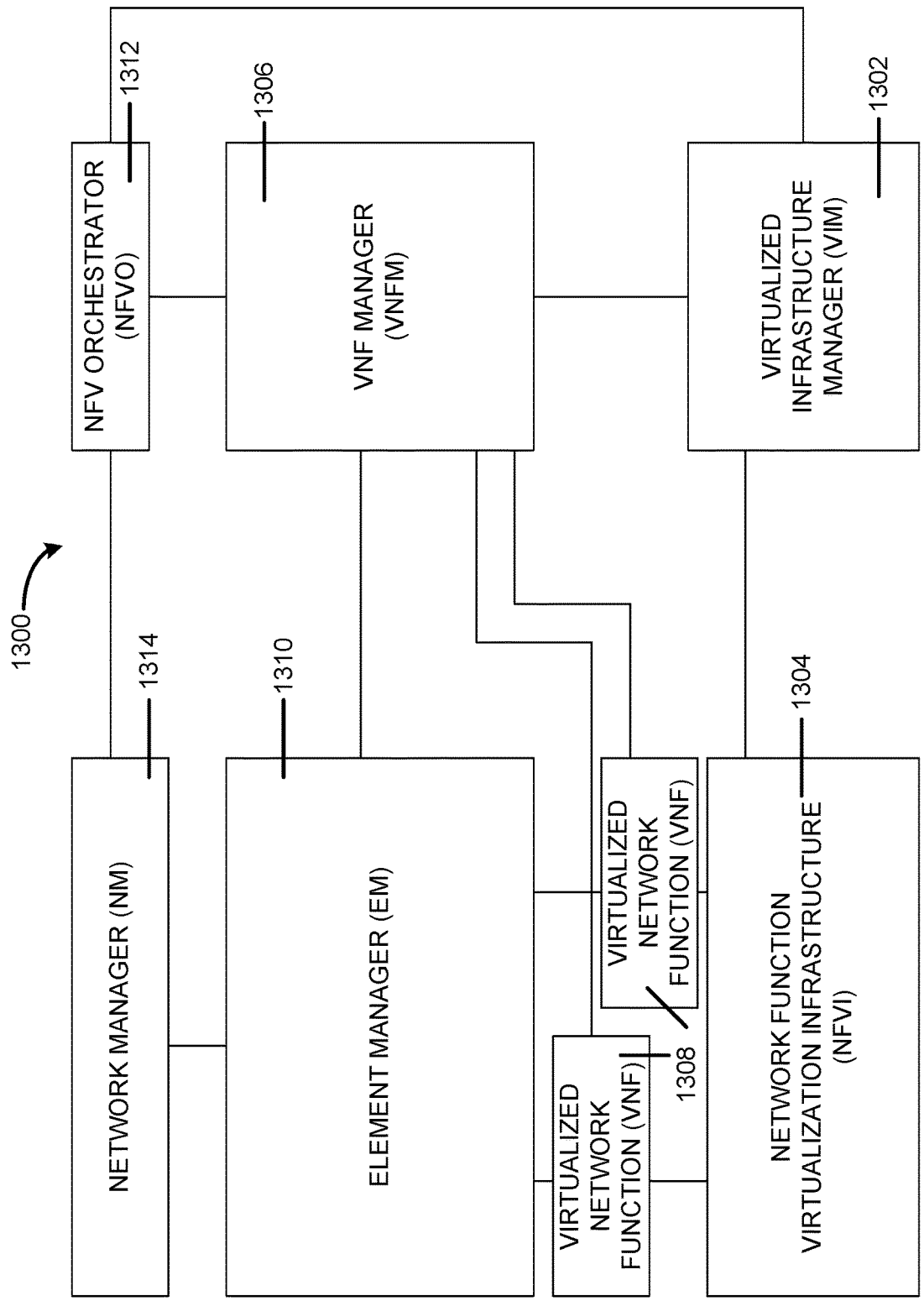
FIG. 13 is a block diagram illustrating components of a system to support NFV, in accordance with various embodiments.

FIG. 13 is a block diagram illustrating components, according to some example embodiments, of a system 1300 to support NFV. The system 1300 is illustrated as including a VIM 1302, an NFVI 1304, an VNFM 1306, VNFs 1308, an EM 1310, an NFVO 1312, and a NM 1314.

The VIM 1302 manages the resources of the NFVI 1304. The NFVI 1304 can include physical or virtual resources and applications (including hypervisors) used to execute the system 1300. The VIM 1302 may manage the life cycle of virtual resources with the NFVI 1304 (e.g., creation, maintenance, and tear down of VMs associated with one or more physical resources), track VM instances, track performance, fault and security of VM instances and associated physical resources, and expose VM instances and associated physical resources to other management systems.

The VNFM 1306 may manage the VNFs 1308. The VNFs 1308 may be used to execute EPC components/functions. The VNFM 1306 may manage the life cycle of the VNFs 1308 and track performance, fault and security of the virtual aspects of VNFs 1308. The EM 1310 may track the performance, fault and security of the functional aspects of VNFs 1308. The tracking data from the VNFM 1306 and the EM 1310 may comprise, for example, PM data used by the VIM 1302 or the NFVI 1304. Both the VNFM 1306 and the EM 1310 can scale up/down the quantity of VNFs of the system 1300.

The NFVO 1312 may coordinate, authorize, release and engage resources of the NFVI 1304 in order to provide the requested service (e.g., to execute an EPC function, component, or slice). The NM 1314 may provide a package of end-user functions with the responsibility for the management of a network, which may include network elements with VNFs, non-virtualized network functions, or both (management of the VNFs may occur via the EM 1310).

Figure 14:
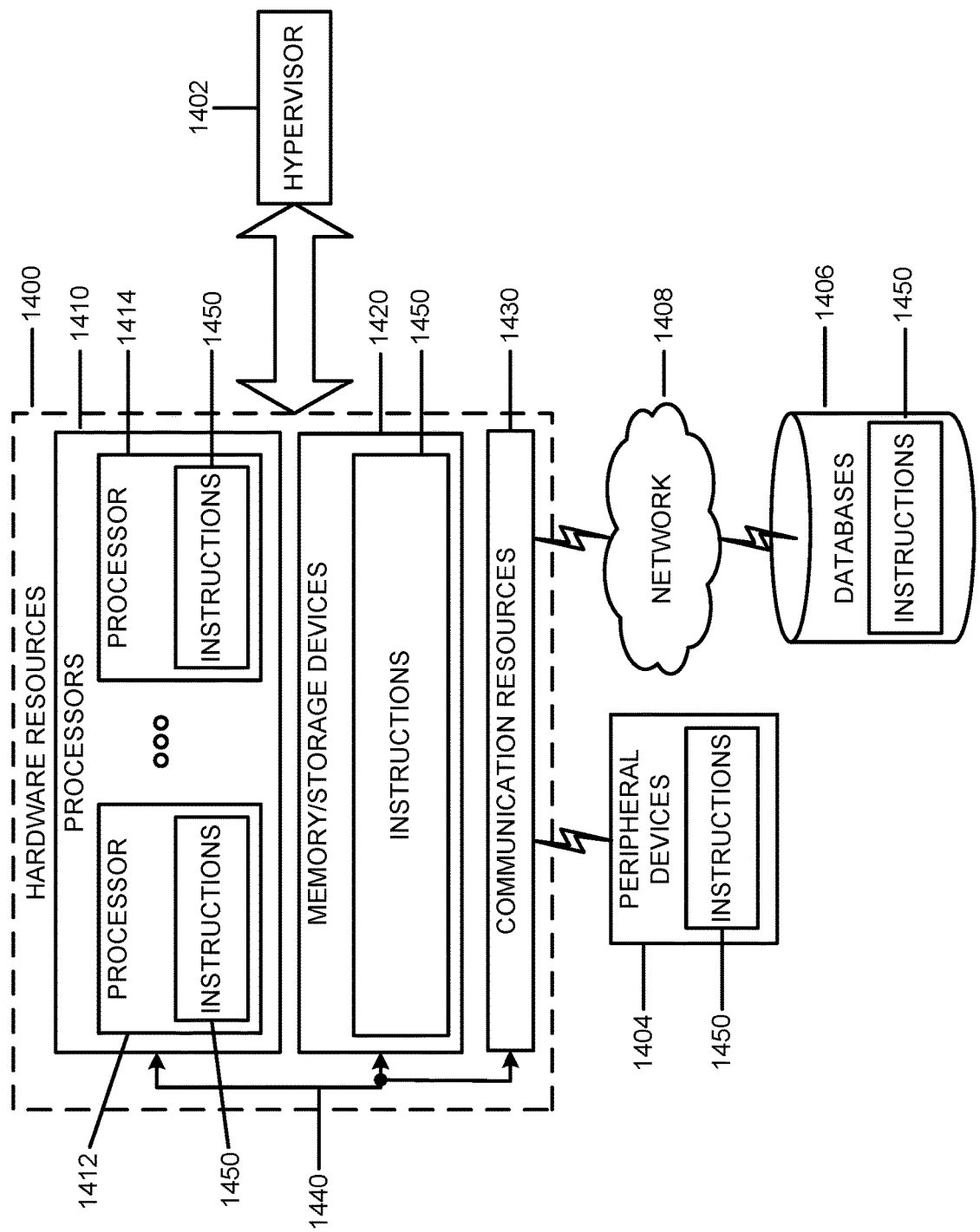
FIG. 14 depicts a block diagram illustrating components, according to some example embodiments, able to read instructions from a machine-readable or computer-readable medium (e.g., a non-transitory machine-readable storage medium) and perform any one or more of the methodologies discussed herein.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440. For embodiments where node virtualization (e.g., NFV) is utilized, a hypervisor 1402 may be executed to provide an execution environment for one or more network slices/sub-slices to utilize the hardware resources 1400.

The processors 1410 may include, for example, a processor 1412 and a processor 1414. The processor(s) 1410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1420 may include main memory, disk storage, or any suitable combination thereof. The memory/storage devices 1420 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1430 may include interconnection or network interface components or other suitable devices to communicate with one or more peripheral devices 1404 or one or more databases 1406 via a network 1408. For example, the communication resources 1430 may include wired communication components (e.g., for coupling via USB), cellular communication components, NFC components, Bluetooth® (or Bluetooth® Low Energy) components, Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

Example Procedures

Figure 15:
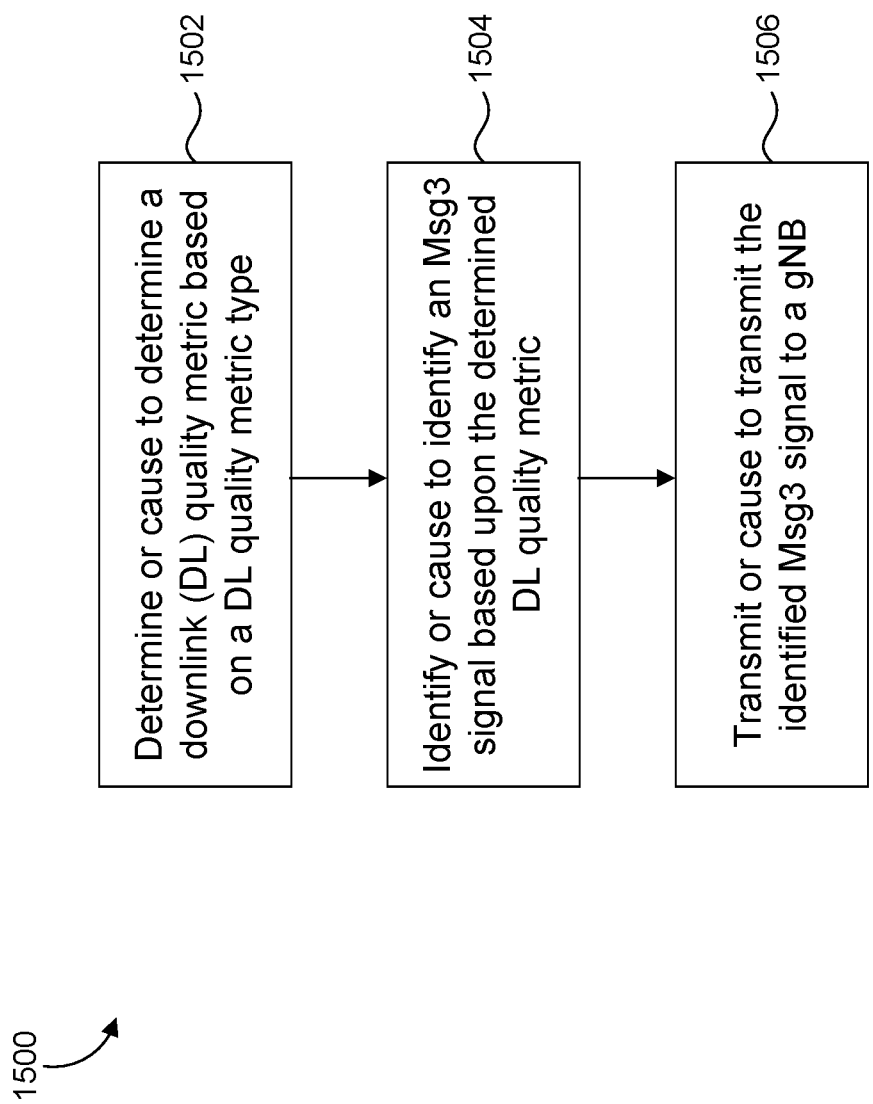
FIG. 15 depicts an example flowchart for practicing the various embodiments discussed herein, for example, for designing quality report for enhanced Machine Type Communication (EMTC) and Narrowband Internet of Things (NB-IOT).

In some embodiments, the electronic device(s), network(s), system(s), chip(s) or component(s), or portions or implementations thereof, of FIGS. 5-14, or some other figure herein, may be configured to perform one or more processes, techniques, or methods as described herein, or portions thereof. One such process is depicted in FIG. 15. FIG. 15 illustrates a flowchart 1500 that describes a UE, such as UE 501, 601, 701, 900, for designing quality report for enhanced Machine Type Communication (EMTC) and Narrowband Internet of Things (NB-IOT), according to embodiments of the disclosure. In embodiments, the flowchart 1500 can be at least partially performed or controlled by a processor or processor circuitry described in the various embodiments herein, including the processor shown in FIG. 14, and/or the application circuitry 805 or 905, and/or baseband circuitry 810 or 910 shown in FIGS. 8-9.

At 1502, a downlink (DL) quality metric based on a DL quality metric type is determined. For example, the UE determine or cause to determine the DL quality metric based on the DL quality metric type. At 1504, a message 3 (Msg3) signal is identified based on the determined DL quality metric. For example, the UE may identify or cause to identify the Msg3 signal based upon the determined DL quality metric. At 1506, the identified Msg3 signal is transmitted to a base station. For example, the UE may transmit or cause to transmit the identified Msg3 signal to a gNB.

According to some embodiments, method 1500 can also include receiving a message 2 (Msg2) signal and determining using the received Msg2 signal, a Physical Random Access Channel (PRACH) Coverage Enhancement (CE) level. In some embodiments, the UE can determine the DL quality metric type based on the PRACH CE level. In response to the PRACH CE level being a first value (e.g., 0) or a second value (e.g., 1), the UE can determine the DL quality metric type to be a Channel Quality Indicator (CQI). Additionally, or alternatively, in response to the PRACH CE level being a third value (e.g., 2) or a fourth value (e.g., 3), the UE can determine the DL quality metric type to be a number of repetitions for decoding Physical Downlink Control Channel (PDCCH).

Figure 16:
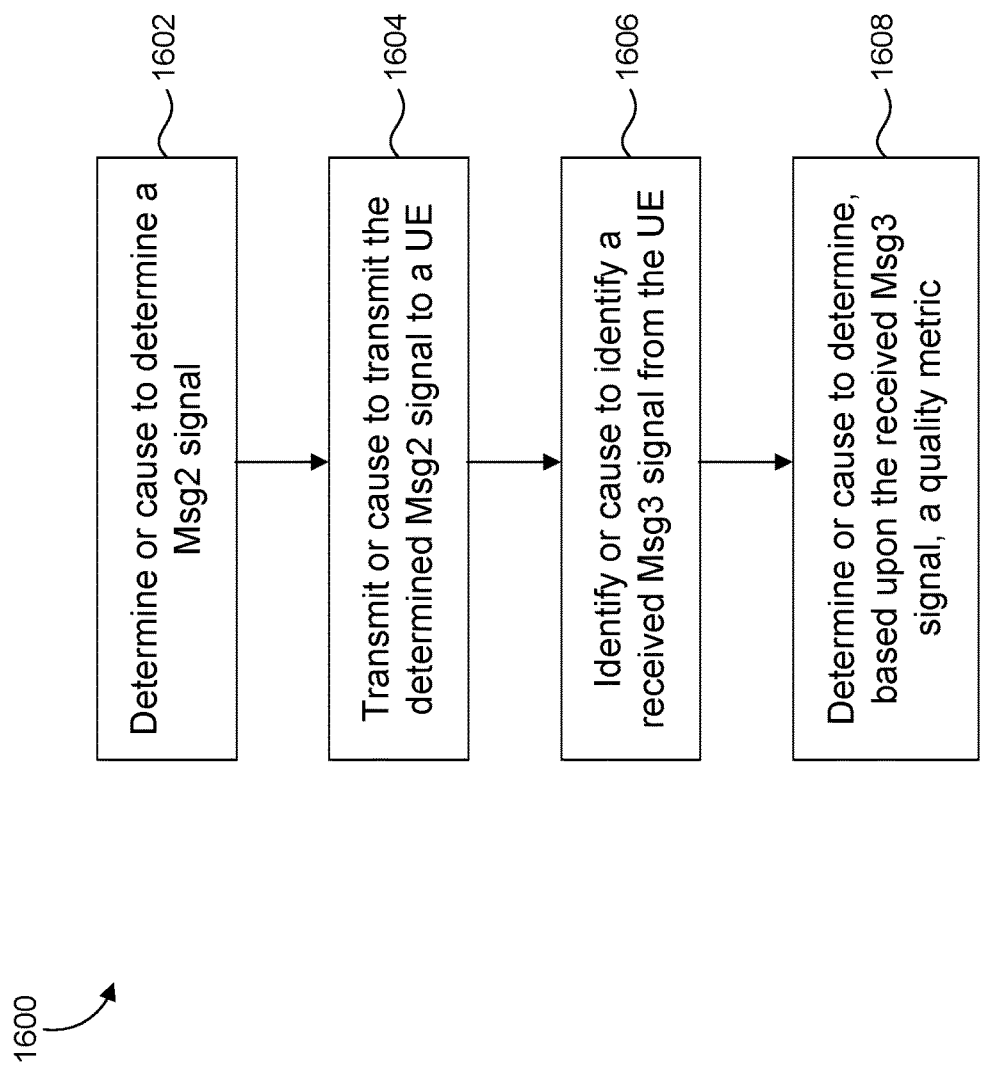
FIG. 16 depicts an example flowchart for practicing the various embodiments discussed herein, for example, for designing quality report for enhanced Machine Type Communication (EMTC) and Narrowband Internet of Things (NB-IOT).

In some embodiments, the electronic device(s), network(s), system(s), chip(s) or component(s), or portions or implementations thereof, of FIGS. 5-14, or some other figure herein, may be configured to perform one or more processes, techniques, or methods as described herein, or portions thereof. One such process is depicted in FIG. 16. FIG. 16 illustrates a flowchart 1600 that describes a base station, such as RAN node 511, AP 506, E-UTRAN 610, RAN 710, infrastructure equipment 800, for designing quality report for enhanced Machine Type Communication (EMTC) and Narrowband Internet of Things (NB-IOT), according to embodiments of the disclosure. In embodiments, the flowchart 1600 can be at least partially performed or controlled by a processor or processor circuitry described in the various embodiments herein, including the processor shown in FIG. 14, and/or the application circuitry 805 or 905, and/or baseband circuitry 810 or 910 shown in FIGS. 8-9.

At 1602, a message 2 (Msg2) signal is determined. For example, the base station may determine or cause to determine the Msg2 signal. At 1604, the determined Msg2 is transmitted to a user equipment (UE). The base station may transmit or cause to transmit the determined Msg2 signal to the UE. At 1606, a message 3 (Msg3) signal is received from the UE and is identified by the base station. For example, the base station may identify or cause to identify the received Msg3 signal from the UE. At 1608, a downlink (DL) quality metric is determined based on the received Msg3 signal. For example, the base station may determine or cause to determine, based upon the received Msg3 signal, the DL quality metric.

According to some embodiments, the DL quality metric can be based on a Channel Quality Indicator (CQI). Additionally, or alternatively, the DL quality metric can be based on a number of repetitions for decoding Physical Downlink Control Channel (PDCCH) with a Block Error Rate (BLER) of about 1%.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a UE apparatus comprising: means for determining or causing to determine a DL quality metric based on a DL quality metric type; means for identifying or causing to identify an Msg3 signal based upon the determined DL quality metric; and means for transmitting or causing to transmit the identified Msg3 signal to a gNB.

Example 2 may include the subject matter of example 1, or of any other example herein, wherein the DL quality metric type is based upon PRACH CE levels.

Example 3 may include the subject matter of example 2, or of any other example herein, wherein the DL quality metric is CQI and the PRACH CE level is 0 or 1.

Example 4 may include the subject matter of example 3, or of any other example herein, further comprising: means for identifying or causing to identify a received Msg2 signal; and upon the Msg2 signal successfully received, means for determining or causing to determine the PRACH CE level.

Example 5 may include the subject matter of example 4, or of any other example herein, wherein the PRACH CE level is based on one or more configured RSRP threshold.

Example 6 may include the subject matter of example 5, or of any other example herein, wherein a PRACH resource is used for UL preamble transmission.

Example 7 may include the subject matter of example 1, or of any other example herein, wherein the DL quality metric type is based upon a number of repetitions required for decoding (M/N)PDCCH.

Example 8 may include the subject matter of example 7, or of any other example herein, wherein the number of repetitions further include the number of repetitions with a BLER of 1%.

Example 9 may include the subject matter of example 1, or of any other example herein, wherein the identified Msg3 signal includes the DL quality metric type.

Example 10 may include the subject matter of example 1, or of any other example herein, wherein the UE is a part of eMTC or non-anchor carrier in NB-IoT.

Example 11 may include a gNB apparatus comprising: means for determining or causing to determine a Msg2 signal; means for transmitting or causing to transmit the determined Msg2 signal to a UE; means for identifying or causing to identify a received Msg3 signal from the UE; means for determining or causing to determine, based upon the received Msg3 signal, a quality metric.

Example 12 may include the subject matter of example 11, or of any other example herein, wherein the quality metric is based on a CQI.

Example 13 may include the subject matter of example 12, or of any other example herein, wherein the CQI is based on a PRACH CE level of 0 or 1.

Example 14 may include the subject matter of example 11, or of any other example herein, wherein the quality metric is based on one or more (M/N)PDCCH repetitions.

Example 15 may include the subject matter of example 14, or of any other example herein, wherein the one or more (M/N)PDCCH repetitions have a BLER of 1%.

Example 16 may include the subject matter of example 11, or of any other example herein, wherein a PRACH resource is used for preamble reception.

Example 17 may include the subject matter of example 11, or of any other example herein, wherein the gNB is a part of eMTC or non-anchor carrier in NB-IoT.

Example 18 may include the system and method of the design of DL channel quality reporting in Msg3 for eMTC and DL channel quality reporting in Msg3 for non-anchor carrier for NB-IoT.

Example 19 may include the subject matter of example 18 or some other example herein, wherein the DL channel quality reporting in Msg3 for eMTC and DL channel quality reporting in Msg3 for non-anchor carrier for NB-IoT can be enabled or disabled by MIB or SIB.

Example 20 may include the subject matter of example 18 or some other example herein, wherein for NB-IoT, the MIB-NB or SIBx-NB (e.g. x=1, 2, or etc.) can indicate whether the DL channel quality reporting in Msg3 is for anchor and/or non-anchor carrier.

Example 21 may include the subject matter of example 18 or some other example herein, wherein the DL channel quality reporting metric can be (N)RSRP and/or (N)RSRQ.

Example 22 may include the subject matter of example 18 or some other example herein, wherein the DL channel quality reporting metric can be CQI, where the CSI table for Rel-13 eMTC or new CQI table introduced in Rel-15 efeMTC can be used.

Example 23 may include the subject matter of example 22 or some other example herein, wherein the parameter used in Rel-13 eMTC CQI table RCSI can be configured by RRC (e.g. via SIB), or a predefined mapping from RCSI to PRACH coverage level, or a predefined mapping from RCSI to Rmax can be used, where Rmax is the configured maximum number of repetitions for type-2 CSS.

Example 24 may include the subject matter of example 18 or some other example herein, wherein the DL channel quality reporting metric can be number of repetitions needed for NPDCCH/MPDDCH detection with BLER of 1%.

Example 25 may include the subject matter of example 24 or some other example herein, wherein the reporting metric candidates can be defined in terms of actual NPDCCH/MPDCCH repetition number, or in terms of the scaled Rmax, where Rmax is the configured maximum number of repetitions for type-2 CSS.

Example 26 may include the subject matter of example 24 or some other example herein, wherein the AL to be used for the hypothetical NPDCCH/MPDCCH detection can be specified in spec, based on (N)PRACH coverage level, based on Rmax where Rmax is the configured maximum number of repetitions for type-2 CSS, or be indicated by SIB signaling.

Example 27 may include the subject matter of example 24 or some other example herein, wherein for NB-IoT, DCI format N1 can be assumed, while for eMTC, a common DCI format can be assumed or the DCI format to be assumed can depend on PRACH coverage level or Rmax for type-2 CSS.

Example 28 may include the subject matter of example 18 or some other example herein, wherein the measurement resources are not defined.

Example 29 may include the subject matter of example 18 or some other example herein, wherein the measurement resources can be defined as N BL/CE (for eMTC) or NB-IoT (for NB-IoT) DL subframes.

Example 30 may include the subject matter of example 18 or some other example herein, wherein the reserved bit(s) in Msg3 can be used for DL channel reporting, or the RRC message can be extended to include an additional IE to carry the quality report, or a dedicated MAC CE can be included in Msg3 to carry the quality report.

Example 31 may include the subject matter of example 18 or some other example herein, wherein the measurement resources are not restricted and are up to UE implementation.

Example 32 may include the subject matter of example 18 or some other example herein, wherein the measurement resources are defined similar as in Rel-14 NB-IoT, where the period used for (N)RSRP estimation for (N)PRACH CE level decision, and/or the period from the beginning of Msg2 reception to the beginning of Msg3 transmission can be defined as the measurement resources.

Example 33 may include the subject matter of example 18 or some other example herein, wherein the eNB can schedule a larger TBS for Msg3 if it enables the DL channel quality reporting, or eNB scheduling supports multiple TBS values (some for Msg3 with DL channel quality reporting and some for Msg3 without DL channel quality reporting), and it can be up to UE to select which TBS to be used.

Example 34 may include the subject matter of example 18 or some other example herein, wherein for retransmission of Msg3, UE can use the same TBS as previous transmission, or DCI format for scheduling of retransmission can be used to indicate UE to transmit a legacy Msg3 to fallback to non-DL quality report Msg3 transmission.

Example 35 may include the subject matter of example 18 or some other example herein, where a particular kind of DL quality metric from Example 5 or Example 7 for UE report in Msg3 is associated with PRACH CE levels.

Example 36 may include the subject matter of example 35 or some other example herein, where the CQI from Example 5 corresponds to the PRACH CE level 0 or 1, and the number of repetitions needed for decoding of hypothetical (M/N)PDCCH with BLER of 1% from Example 7, otherwise.

Example 37 may include a subject matter of example 18, or of some other example herein, where the "E" field of the MAC subheader is checked first to determine it is the last subheader (i.e., E=0) and, if "E"=0 then "R" field and "F2" field are used for the 2 bit quality report in Msg3.

Example 38 may include a UE to: determine or cause to determine a DL quality metric based on a DL quality metric type; identify or cause to identify an Msg3 signal based upon the determined DL quality metric; and transmit or cause to transmit the identified Msg3 signal to a gNB.

Example 39 may include the subject matter of example 38, or of any other example herein, wherein the DL quality metric type is based upon PRACH CE levels.

Example 40 may include the subject matter of example 39, or of any other example herein, wherein the DL quality metric is CQI and the PRACH CE level is 0 or 1.

Example 41 may include the subject matter of example 40, or of any other example herein, further to: identify or cause to identify a received Msg2 signal; and upon the Msg2 signal successfully received, determine or cause to determine the PRACH CE level.

Example 42 may include the subject matter of example 41, or of any other example herein, wherein the PRACH CE level is based on one or more configured RSRP threshold.

Example 43 may include the subject matter of example 42, or of any other example herein, wherein a PRACH resource is used for UL preamble transmission.

Example 44 may include the subject matter of example 38, or of any other example herein, wherein the DL quality metric type is based upon a number of repetitions required for decoding (M/N)PDCCH.

Example 45 may include the subject matter of example 44, or of any other example herein, wherein the number of repetitions further include the number of repetitions with a BLER of 1%.

Example 46 may include the subject matter of example 38, or of any other example herein, wherein the identified Msg3 signal includes the DL quality metric type.

Example 47 may include the subject matter of example 38, or of any other example herein, wherein the UE is a part of eMTC or non-anchor carrier in NB-IoT.

Example 48 may include a gNB apparatus to: determine or cause to determine a Msg2 signal; transmit or cause to transmit the determined Msg2 signal to a UE; identify or cause to identify a received Msg3 signal from the UE; determine or cause to determine, based upon the received Msg3 signal, a quality metric.

Example 49 may include the subject matter of example 48, or of any other example herein, wherein the quality metric is based on a CQI.

Example 50 may include the subject matter of example 49, or of any other example herein, wherein the CQI is based on a PRACH CE level of 0 or 1.

Example 51 may include the subject matter of example 48, or of any other example herein, wherein the quality metric is based on one or more (M/N)PDCCH repetitions.

Example 52 may include the subject matter of example 51, or of any other example herein, wherein the one or more (M/N)PDCCH repetitions have a BLER of 1%.

Example 53 may include the subject matter of example 48, or of any other example herein, wherein a PRACH resource is used for preamble reception.

Example 54 may include the subject matter of example 48, or of any other example herein, wherein the gNB is a part of eMTC or non-anchor carrier in NB-IoT.

Example 55 may include a method for implementing a user equipment (UE) comprising: determining or causing to determine a DL quality metric based on a DL quality metric type; identifying or causing to identify an Msg3 signal based upon the determined DL quality metric; and transmitting or causing to transmit the identified Msg3 signal to a gNB.

Example 56 may include the subject matter of example 55, or of any other example herein, wherein the DL quality metric type is based upon PRACH CE levels.

Example 57 may include the subject matter of example 56, or of any other example herein, wherein the DL quality metric is CQI and the PRACH CE level is 0 or 1.

Example 58 may include the subject matter of example 57, or of any other example herein, further comprising: identifying or causing to identify a received Msg2 signal; and upon the Msg2 signal successfully received, determining or causing to determine the PRACH CE level.

Example 59 may include the subject matter of example 58, or of any other example herein, wherein the PRACH CE level is based on one or more configured RSRP threshold.

Example 60 may include the subject matter of example 59, or of any other example herein, wherein a PRACH resource is used for UL preamble transmission.

Example 61 may include the subject matter of example 55, or of any other example herein, wherein the DL quality metric type is based upon a number of repetitions required for decoding (M/N)PDCCH.

Example 62 may include the subject matter of example 61, or of any other example herein, wherein the number of repetitions further include the number of repetitions with a BLER of 1%.

Example 63 may include the subject matter of example 55, or of any other example herein, wherein the identified Msg3 signal includes the DL quality metric type.

Example 64 may include the subject matter of example 55, or of any other example herein, wherein the UE is a part of eMTC or non-anchor carrier in NB-IoT.

Example 65 may include a method for implementing a gNB comprising: determining or causing to determine a Msg2 signal; transmitting or causing to transmit the determined Msg2 signal to a UE; identifying or causing to identify a received Msg3 signal from the UE; determining or causing to determine, based upon the received Msg3 signal, a quality metric.

Example 65 may include the subject matter of example 65, or of any other example herein, wherein the quality metric is based on a CQI.

Example 66 may include the subject matter of example 65, or of any other example herein, wherein the CQI is based on a PRACH CE level of 0 or 1.

Example 67 may include the subject matter of example 65, or of any other example herein, wherein the quality metric is based on one or more (M/N)PDCCH repetitions.

Example 68 may include the subject matter of example 67, or of any other example herein, wherein the one or more (M/N)PDCCH repetitions have a BLER of 1%.

Example 69 may include the subject matter of example 65, or of any other example herein, wherein a PRACH resource is used for preamble reception.

Example 70 may include the subject matter of example 65, or of any other example herein, wherein the gNB is a part of eMTC or non-anchor carrier in NB-IoT.

Example 71 may include an apparatus comprising means to perform one or more elements of a method described in or related to any of examples 1-70, or any other method or process described herein.

Example 72 may include one or more non-transitory computer-readable media comprising instructions to cause an electronic device, upon execution of the instructions by one or more processors of the electronic device, to perform one or more elements of a method described in or related to any of examples 1-70, or any other method or process described herein.

Example 73 may include an apparatus comprising logic, modules, or circuitry to perform one or more elements of a method described in or related to any of examples 1-70, or any other method or process described herein.

Example 74 may include a method, technique, or process as described in or related to any of examples 1-70, or portions or parts thereof.

Example 75 may include an apparatus comprising: one or more processors and one or more computer-readable media comprising instructions that, when executed by the one or more processors, cause the one or more processors to perform the method, techniques, or process as described in or related to any of examples 1-70, or portions thereof.

Example 76 may include a signal as described in or related to any of examples 1-70, or portions or parts thereof.

Example 77 may include a signal in a wireless network as shown and described herein.

Example 78 may include a method of communicating in a wireless network as shown and described herein.

Example 79 may include a system for providing wireless communication as shown and described herein.

Example 80 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein, but are not meant to be limiting.

3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation
AP Application Protocol, Antenna Port, Access Point
API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Special Mobile
GTP GPRS Tunneling Protocol
GTP-U GPRS Tunnelling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO, HO Handover
HFN HyperFrame Number
HHO Hard Handover
HLR Home Location Register
HN Home Network
HO Handover
HPLMN Home Public Land Mobile Network
HSDPA High Speed Downlink Packet Access
HSN Hopping Sequence Number
HSPA High Speed Packet Access
HSS Home Subscriber Server HSUPA High Speed Uplink Packet Access
HTTP Hyper Text Transfer Protocol
HTTPS Hyper Text Transfer Protocol Secure (https is http/1.1 over SSL, i.e. port 443)
I-Block Information Block
ICCID Integrated Circuit Card Identification
ICIC Inter-Cell Interference Coordination
ID Identity, identifier
IDFT Inverse Discrete Fourier Transform
IE Information element
IBE In-Band Emission
IEEE Institute of Electrical and Electronics Engineers
IEI Information Element Identifier
IEIDL Information Element Identifier Data Length
IETF Internet Engineering Task Force
IF Infrastructure
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
K Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LBT Listen Before Talk
LCM LifeCycle Management
LCR Low Chip Rate
LCS Location Services
LCID Logical Channel ID
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)
MAC Message authentication code (security/encryption context)
MAC-A MAC used for authentication and key agreement (TSG T WG3 context)
MAC-I MAC used for data integrity of signalling messages (TSG T WG3 context)
MANO Management and Orchestration
MBMS Multimedia Broadcast and Multicast Service
MB SFN Multimedia Broadcast multicast service Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management
MME Mobility Management Entity
MN Master Node
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massive MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non-Access Stratum layer
NCT Network Connectivity Topology
NEC Network Capability Exposure
NE-DC NR-E-UTRA Dual Connectivity
NEF Network Exposure Function
NF Network Function NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAI Network Slice Selection Assistance Information
S-NNSAI Single-NS SAI
NSSF Network Slice Selection Function
NW Network
NWUS Narrowband wake-up signal, Narrowband WUS
NZP Non-Zero Power
O&M Operation and Maintenance
ODU2 Optical channel Data Unit—type 2
OFDM Orthogonal Frequency Division Multiplexing
OFDMA Orthogonal Frequency Division Multiple Access
OOB Out-of-band
OOS Out of Sync
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol, Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
RIV Resource indicator value
RL Radio Link
RLC Radio Link Control, Radio Link Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Service Discovery Protocol (Bluetooth related)
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastructure
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
VPLMN Visited Public Land Mobile Network
VPN Virtual Private Network
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML eXtensible Markup Language
XRES EXpected user RESponse
XOR eXclusive OR
ZC Zadoff-Chu
ZP Zero Power Terminology For the purposes of the present document, the following terms and definitions are applicable to the examples and embodiments discussed herein, but are not meant to be limiting.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A user equipment (UE), comprising:
    radio front end circuitry; and
    processor circuitry, coupled to the radio front end circuitry, and configured to:
        signal to a base station a capability of transmitting a downlink (DL) quality report using a message 3 (Msg3) signal for determination of a minimum uplink (UL) grant for the Msg3 signal;
        determine a DL quality metric based on a DL quality metric type;
        identify the Msg3 signal based on the DL quality metric; and
        transmit, using the radio front end circuitry and to the base station, the DL quality report based on the DL quality metric and using the Msg3 signal.

2. The UE of claim 1, wherein the processor circuitry is further configured to:
    receive, using the radio front end circuitry, a message 2 (Msg2) signal; and
    determine, using the received Msg2 signal, a Physical Random Access Channel (PRACH) Coverage Enhancement (CE) level.

3. The UE of claim 2, wherein the processor circuitry is configured to determine the DL quality metric type based on the PRACH CE level.

4. The UE of claim 3, wherein in response to the PRACH CE level being a first value or a second value, the processor circuitry is configured to determine the DL quality metric type to be a Channel Quality Indicator (CQI).

5. The UE of claim 4, wherein in response to the PRACH CE level being a third value or a fourth value, the processor circuitry is configured to determine the DL quality metric type to be a number of repetitions for decoding a Physical Downlink Control Channel (PDCCH).

6. The UE of claim 5, wherein the number of repetitions include a number of repetitions for decoding the PDCCH with a Block Error Rate (BLER) of about 1%.

7. The UE of claim 2, wherein the processor circuitry is configured to determine the PRACH CE based on one or more Reference Signal Received Power (RSRP) thresholds.

8. The UE of claim 1, wherein the Msg3 signal is for a non-anchor carrier in Narrowband Internet of Things (NB-IOT) (NB-IOT).

9. A method, comprising:
    signaling, by a user equipment (UE) and to a base station, a capability of transmitting a downlink (DL) quality report using a message 3 (Msg3) signal for determination of a minimum uplink (UL) grant for the Msg3 signal;
    receiving, by the UE, a message 2 (Msg2) signal;
    determining, by the UE and using the received Msg2 signal, a DL quality metric based on a DL quality metric type;
    identifying, by the UE, the Msg3 signal based on the DL quality metric; and
    transmitting, by the UE and to the base station, the DL quality report based on the DL quality metric and using the Msg3 signal.

10. The method of claim 9, further comprising:
    determining, using the received Msg2 signal, a Physical Random Access Channel (PRACH) Coverage Enhancement (CE) level.

11. The method of claim 10, wherein determining the DL quality metric type comprises determining the DL quality metric type based on the PRACH CE level.

12. The method of claim 11, further comprising:
    determining the DL quality metric type to be a Channel Quality Indicator (CQI) in response to the PRACH CE level being a first value or a second value.

13. The method of claim 12, further comprising:
    determining the DL quality metric type to be a number of repetitions for decoding a Physical Downlink Control Channel (PDCCH) in response to the PRACH CE level being a third value or a fourth value.

14. The method of claim 13, wherein the number of repetitions include a number of repetitions for decoding the PDCCH with a Block Error Rate (BLER) of about 1%.

15. The method of claim 10, further comprising:
    determining the PRACH CE based on one or more Reference Signal Received Power (RSRP) thresholds.

16. A base station, comprising:
    radio front end circuitry; and
    processor circuitry, coupled to the radio front end circuitry, and configured to:
        receive, using the radio front end circuitry, a capability of a user equipment (UE) to transmit a downlink (DL) quality report using a message 3 (Msg3) signal for determination of a minimum uplink (UL) grant for the Msg3 signal;
        transmit, using the radio front end circuitry, a message 2 (Msg2) signal to the UE;
        receive, using the radio front end circuitry, the Msg3 signal from the UE; and
        determine, based on the received Msg3 signal, a DL quality metric.

17. The base station of claim 16, wherein the DL quality metric is based on a Channel Quality Indicator (CQI).

18. The base station of claim 16, wherein the DL quality metric is based on a number of repetitions for decoding a Physical Downlink Control Channel (PDCCH) with a Block Error Rate (BLER) of about 1%.

19. The base station of claim 18, wherein the repetitions comprise repetitions associated with a Narrowband Physical Downlink Control Channel (NPDCCH) or a Machine Type Communication (MTC) Physical Downlink Control Channel.

20. The base station of claim 16, wherein the base station is associated with an enhanced Machine Type Communication (EMTC) or a non-anchor carrier in Narrowband Internet of Things (NB-IOT).

\* \* \* \* \*

UNITED STATES PATENT AND TRADEMARK OFFICE
CERTIFICATE OF CORRECTION

PATENT NO. : 12,069,733 B2
APPLICATION NO. : 17/427492
DATED : August 20, 2024
INVENTOR(S) : Ye et al.

Page 1 of 1

It is certified that error appears in the above-identified patent and that said Letters Patent is hereby corrected as shown below:

In the Specification

In Column 25, Line 27, delete "eNB s," and insert -- eNBs, --, therefor.

In Column 31, Line 37, delete "MMES" and insert -- MMEs --, therefor.

In Column 31, Line 40, delete "MMES" and insert -- MMEs --, therefor.

In Column 31, Line 49, delete "MMES" and insert -- MMEs --, therefor.

In Column 31, Line 49, delete "MMES" and insert -- MMEs --, therefor.

In Column 35, Line 9, delete "SLAB" and insert -- SLAs --, therefor.

In Column 42, Line 67, delete "(IMUS)" and insert -- (IMUs) --, therefor.

In Column 71, Line 30, delete "Single-NS SAI" and insert -- Single-NSSAI --, therefor.

In the Claims

In Column 80, Claim 8, Lines 2-3, delete "(NB-IOT) (NB-IOT)." and insert -- (NB-IoT). --, therefor.

Signed and Sealed this
First Day of October, 2024

Katherine Kelly Vidal
*Director of the United States Patent and Trademark Office*